US008745595B2

(12) United States Patent
Uno

(10) Patent No.: US 8,745,595 B2
(45) Date of Patent: Jun. 3, 2014

(54) INFORMATION PROCESSING APPARATUS AND METHOD OF ACQUIRING TRACE LOG

(75) Inventor: Souichi Uno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 13/356,066

(22) Filed: Jan. 23, 2012

(65) Prior Publication Data

US 2012/0233600 A1 Sep. 13, 2012

(30) Foreign Application Priority Data

Mar. 10, 2011 (JP) ................................. 2011-052592

(51) Int. Cl.
*G06F 9/45* (2006.01)
(52) U.S. Cl.
USPC ......................................... 717/128; 717/131
(58) Field of Classification Search
USPC ................................................ 717/124–160
See application file for complete search history.

(56) References Cited

U.S. PATENT DOCUMENTS

2005/0138111 A1* 6/2005 Aton et al. .................... 709/201

FOREIGN PATENT DOCUMENTS

JP           2000-207246 A        7/2000

* cited by examiner

*Primary Examiner* — Chuck Kendall
(74) *Attorney, Agent, or Firm* — Fujitsu Patent Center

(57) ABSTRACT

In an information processing apparatus, a program execution section executes a program, and in the stage of execution of a log acquisition command, acquires the value of a variable set in the log acquisition command. A trace log generation section generates a trace log including identification information on a file set in the log acquisition command, version number on a source code, and the acquired value of the variable, and stores the trace log in a storage device. A source code acquisition section acquires a source code corresponding to a combination of the identification information and the version number, based on the trace log. A character string addition section extracts a character string related to the value of the variable included in the trace code, from the acquired source code, adds the extracted character string to the trace log, and stores the trace log in a storage device.

11 Claims, 23 Drawing Sheets

FIG. 23

```
■File1.c                                                              — 81
0001  #define ID $Id$
0002  #define REV $Rev$
0003
0004  int func1(int param1)
0005  {
0006      int ret1 = 0;
0007
0008      ....
0009      trace_log(ID, __LINE__, REV, "func1_TRACE_01 param1:", "%d", param1);
0010      ....
0011
0012      trace_log(ID, __LINE__, REV, "func1_TRACE_02 ret1:", "%d", ret1);
0013      return ret1;
0014  }
```

```
■File2.c                                                              — 82
0001  #define ID $Id$
0002  #define REV $Rev$
0003
0004  int func2(int param2)
0005  {
0006      int ret2 = 0;
0007
0008      ....
0009      trace_log(ID, __LINE__, REV, "func2_TRACE_01 param2:", "%d", param2);
0010      ....
0011
0012      trace_log(ID, __LINE__, REV, "func2_TRACE_02 ret2:", "%d", ret2);
0013      return ret2;
0014  }
```

```
■File1.c                                                              — 83
0001  #define ID 0x01234567
0002  #define REV 111
0003
0004  int func1(int param1)
0005  {
0006      int ret1 = 0;
0007
0008      ....
0009      trace_log(ID, __LINE__, REV, "func1_TRACE_01 param1:", "%d", param1);
0010      ....
0011
0012      trace_log(ID, __LINE__, REV, "func1_TRACE_02 ret1:", "%d", ret1);
0013      return ret1;
0014  }
```

```
■File2.c                                                              — 84
0001  #define ID 0x89abcdef
0002  #define REV 222
0003
0004  int func2(int param2)
0005  {
0006      int ret2 = 0;
0007
0008      ....
0009      trace_log(ID, __LINE__, REV, "func2_TRACE_01 param2:", "%d", param2);
0010      ....
0011
0012      trace_log(ID, __LINE__, REV, "func2_TRACE_02 ret2:", "%d", ret2);
0013      return ret2;
0014  }
```

INFORMATION PROCESSING APPARATUS AND METHOD OF ACQUIRING TRACE LOG

CROSS-REFERENCE TO RELATED APPLICATION

This application is based upon and claims the benefit of priority of the prior Japanese Patent Application No. 2011-052592, filed on Mar. 10, 2011, the entire contents of which are incorporated herein by reference.

FIELD

The embodiments discussed herein are related to an information processing apparatus for acquiring a trace log, and a trace log-acquiring method.

BACKGROUND

During development of software, debug operations for finding errors in the software are carried out. To perform a debug operation efficiently, it is effective to acquire information items concerning processing states, such as the current contents of a variable, as logs, at important processing points of the debug process. Further, for checking an operating state of software mounted on a device, if information items e.g. on the contents of variables in process, are acquired as logs, it is possible to facilitate analysis of the operating state of the software. Such information concerning states of software during execution of a program is called a trace log. In the trace log, details of processing, events, data communication history, etc. occurring on a computer are recorded together with the date and time of each occurrence thereof. By making use of the trace log, debug operations during development of software, and analysis operations for specifying causes of abnormality can be facilitated. In many cases, trace logs are coded to reduce the amount of data.

As a technique for acquiring a trace log, there has been proposed e.g. a technique of inserting a log output command for recording a process of execution into a source code, to thereby record the process of execution only on points related to attention-paid portions designated by a user. In this technique, an identifier number is caused to be included in log data, and the correspondence between the identifier number and other information, such as a file number or the like, is managed by data of another identifier (see e.g. Japanese Laid-Open Patent Publication No. 2000-207246).

However, conventionally, if there are trace logs in a mixed manner which are acquired during execution of a plurality of programs which are based on source codes different in version number, it is impossible to determine which version number of a source code contains commands causing generation of each trace log. As a consequence, it has been difficult to accurately analyze the operation of the software using the trace logs.

SUMMARY

According to an aspect of the invention, there is provided an information processing apparatus including one or more processors configured to perform a procedure, the procedure including: executing a program including a log acquisition command having set therein identification information on a file describing a source code of the program, version number information on the source code, and a variable, and acquiring a value of the variable set in the log acquisition command when the log acquisition command has reached a stage of execution; and generating a trace log including the identification information on the file and the version number information set in the log acquisition command in the stage of execution, and the value of the acquired variable, and storing the trace log in a storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 23 illustrates an example of a source code according to a fifth embodiment.

DESCRIPTION OF EMBODIMENTS

Figure 1:
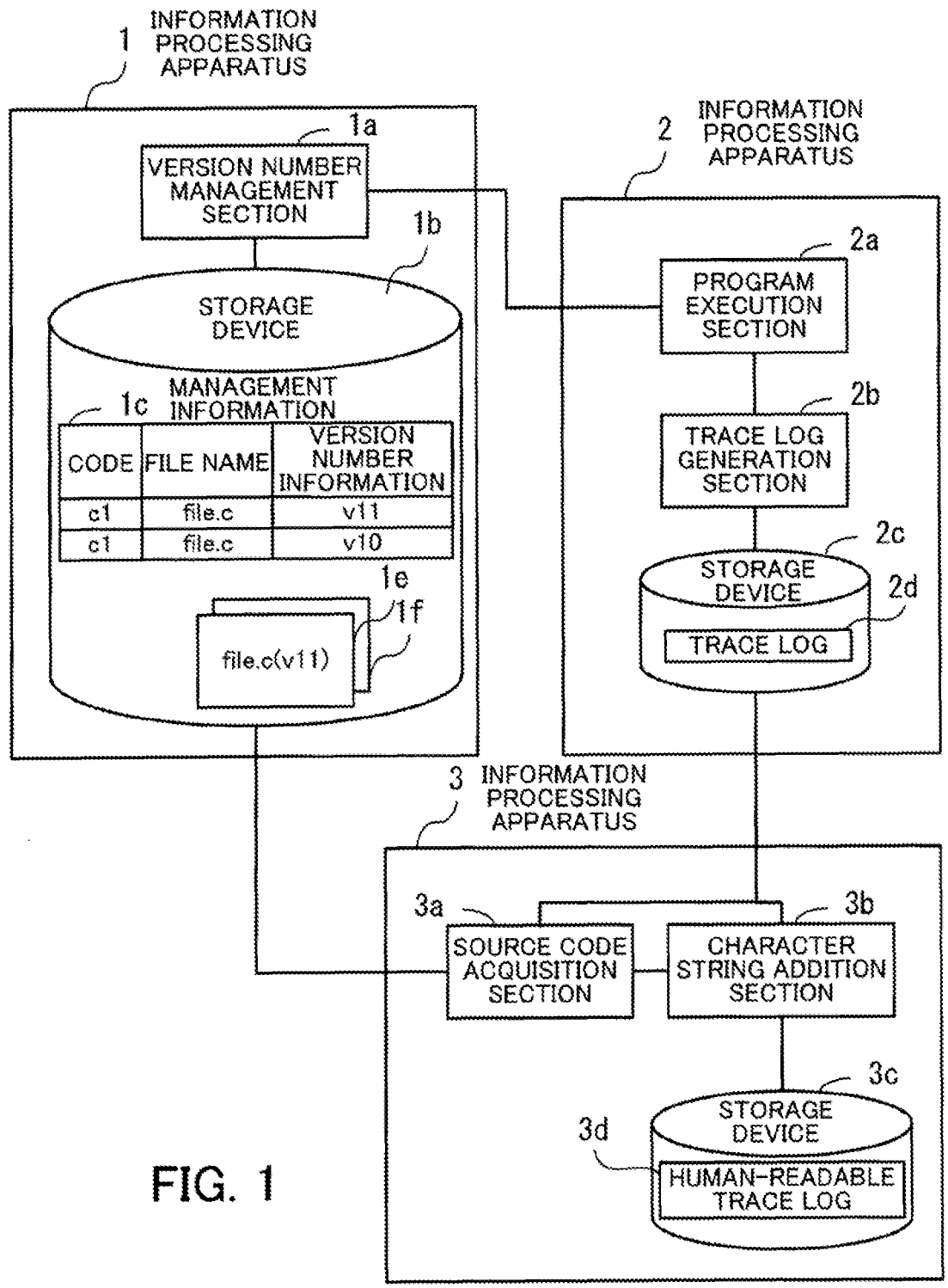
FIG. 1 illustrates an example of the functional configuration of an apparatus according to a first embodiment.

Embodiments of the present invention will be explained below with reference to the accompanying drawings, wherein like reference numerals refer to like elements throughout. Note that the embodiments described hereafter can be executed by combining a plurality of them insofar as the resulting combination does not contain a contradiction.

First Embodiment

FIG. 1 is a view of an example of the functional configuration of an apparatus according to a first embodiment. In the first embodiment, there are provided three information processing apparatuses 1 to 3. The information processing apparatus 1 is used for developing software, for example. Further, the information processing apparatus 2 is used for executing the software, for example. The information processing apparatus 3 is used for analyzing a trace log, for example.

The information processing apparatus 1 includes version number management section 1a and a storage device 1b.

The version number management section 1a sets codes uniquely associated with the file names of files 1e and 1f describing source codes of a program, as identification information for identifying the files, in log acquisition commands included in the source codes. Further, the version number management section 1a sets version number information on the source codes in the log acquisition commands. Furthermore, the version number management section 1a stores management information 1c including the file names of files describing the source codes, the codes corresponding to the file names, and the version number information on the source codes, in the storage device 1b, in association with the files 1e and 1f describing the source codes. The files 1e and 1f describing the source codes are stored in the storage device 1b, for example.

The storage device 1b stores the management information 1c. Further, the storage device 1b stores the files 1e and 1f describing the source codes, for example.

The information processing apparatus 2 includes program execution section 2a, trace log generation section 2b, and a storage device 2c.

The program execution section 2a executes a program including identification information on files describing source codes of the program, version number information on the source codes, and log acquisition commands having variables set therein. When any of the log acquisition commands has reached a stage of execution, the program execution section 2a acquires the value of a variable set in the log acquisition command in the stage of execution.

The trace log generation section 2b generates a trace log 2d including identification information and version number information on the file set in the log acquisition command in the stage of execution, and the value of the variable acquired by the program execution section 2a, and stores the trace log 2d in the storage device 2c.

The storage device 2c stores the trace log 2d.

The information processing apparatus 3 includes source code acquisition section 3a, character string addition section 3b, and a storage device 3c.

The source code acquisition section 3a acquires a source code corresponding to a combination of identification information and version number information on each file, based on the trace log 2d. For example, the identification information on a file included in the trace log 2d is a code uniquely associated with a file name of a file describing a source code. In this case, the source code acquisition section 3a determines the file name corresponding to the code included in the trace log 2d based on the management information 1c in which is registered the correspondence between the file name of the file describing the source code and the code uniquely associated with the file name of the file. Then, the source code acquisition section 3a acquires the source code from the file corresponding to the combination of the file name and the version number information included in the trace log 2d.

The character string addition section 3b extracts a character string related to a trace log from a source code acquired based on the trace log, adds the extracted character string to the trace log, and stores the trace log having the character string added thereto in the storage device. For example, when a code uniquely associated with a file name of a file describing a source code is included in a trace log, the character string addition section 3b adds the file name associated with the code to the trace log. Further, the character string addition section 3b extracts a character string related to a value of a variable included in the trace log from the source code, and adds the extracted character string to the trace log.

Note that lines connecting between elements illustrated in FIG. 1 indicate some of communication paths, and it is possible to set communication paths other than the illustrated communication paths. Further, the version number management section 1a can be realized by a CPU (Central Processing Unit) included in the information processing apparatus 1. Further, the version number management section 1a can be realized by the storage device 1b, a RAM (Random Access Memory) or a hard disk drive (HDD) included in the information processing apparatus 1. The program execution section 2a and the trace log generation section 2b can be realized by a CPU included in the information processing apparatus 2. Further, the program execution section 2a and the trace log generation section 2b can be realized by the storage device 2c, a RAM or an HDD included in the information processing apparatus 2. The source code acquisition section 3a and the character string addition section 3b can be realized by a CPU included in the information processing apparatus 3. Further, the source code acquisition section 3a and the character string addition section 3b can be realized by the storage device 3c, a RAM or an HDD included in the information processing apparatus 3.

A system configured as above acquires a trace log during execution of the program and makes the trace log human-readable.

Figure 2:
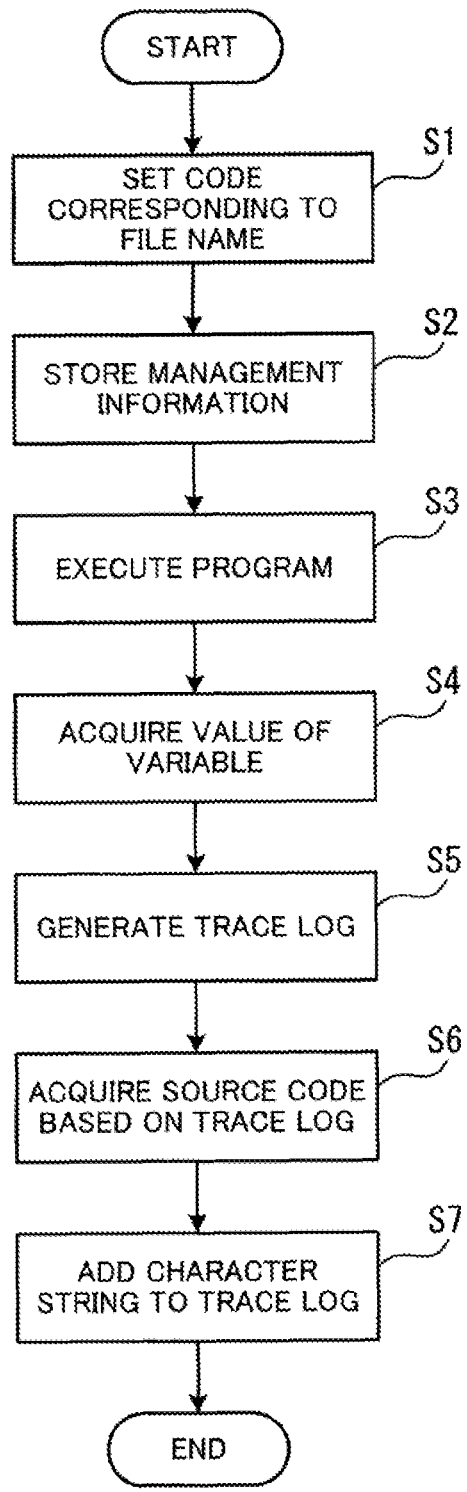
FIG. 2 is an example of a flowchart of a process according to the first embodiment.

FIG. 2 is an example of a flowchart of a process according to the first embodiment. Hereinafter, a description will be given of the FIG. 2 process in order of step number.

[Step S1] The version number management section 1a of the information processing apparatus 1 sets a code corresponding to a file name of a file describing a source code, for a log acquisition command in the source code.

[Step S2] The version number management section 1a of the information processing apparatus 1 stores management information 1c indicative of the correspondence between the file name and the code, in the storage device 1b.

[Step S3] The program execution section 2a of the information processing apparatus 2 acquires a program including the log acquisition command having the code corresponding to the file name set therein, from the information processing apparatus 1, and executes the program.

[Step S4] When the log acquisition command has reached the stage of execution, the program execution section 2a of the information processing apparatus 2 acquires the value of a variable included in the current log acquisition command.

[Step S5] The trace log generation section 2b generates a trace log 2d including a code and version number information set in the log acquisition command in the stage of execution, and the value of the variable acquired by the program execution section 2a. Then, the trace log generation section 2b stores the generated trace log 2d in the storage device 2c.

[Step S6] The source code acquisition section 3a of the information processing apparatus 3 acquires a source code corresponding to a combination of identification information and version number information on a file based on the trace log 2d stored in the storage device 2c. For example, the information processing apparatus 3 refers to the management information 1c stored in the storage device 1b of the information processing apparatus 1, and determines a file name corresponding to the code included in the trace log 2d. Then, the source code acquisition section 3a acquires a source code from a file which has the file name corresponding to the code and has a version number corresponding to the version number information included in the trace log 2d.

[Step S7] The character string addition section 3b of the information processing apparatus 3 extracts a character string related to the trace log 2d from the source code acquired in the step S6, and adds the character string to the trace log 2d. For example, the character string addition section 3b extracts a character string related to a value of a variable included in the trace log 2d from the source code, and adds the character string to the trace log 2d. Further, the character string addition section 3b adds the file name corresponding to the code included in the trace log 2d to the trace log 2d. In doing this, the character string addition section 3b may delete the code from the trace log 2d. After that, the character string addition section 3b stores a human-readable trace log 3d having the character string added thereto in the storage device 3c.

As described above, the trace log is made human-readable, whereby it is possible to acquire the human-readable trace log 3d description of which can be understood by human.

Figure 3:
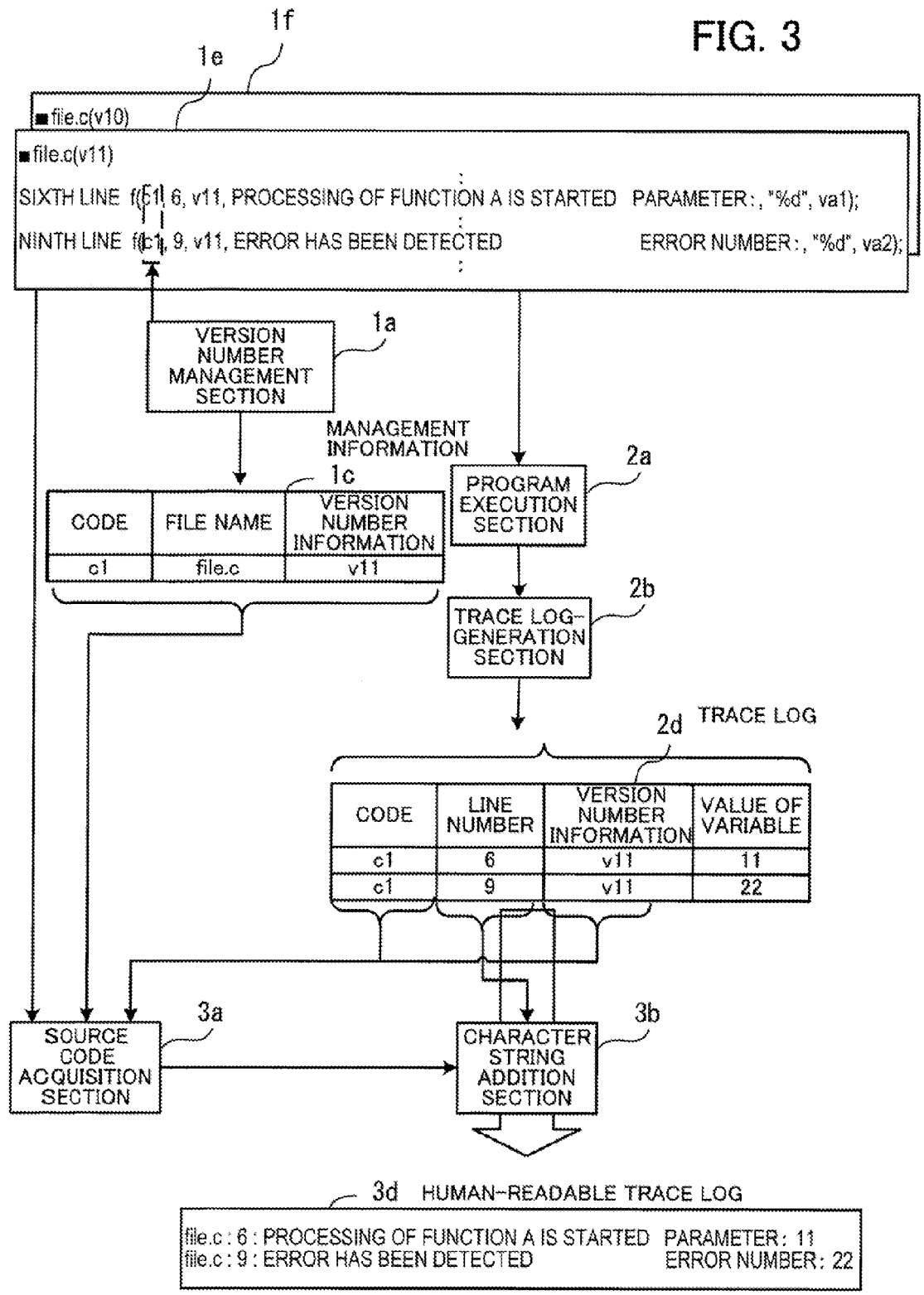
FIG. 3 illustrates an example of making a trace log human-readable.

FIG. 3 illustrates an example of making a trace log human-readable. In the FIG. 3 example, there are provided two files 1e and 1f which have a file name of "file.c" and are different in version number. The files 1e and 1f describe source codes, respectively. For example, the source code of the file 1e describes log acquisition commands at sixth and ninth lines therein. Further, in the file 1e, a code "c1" uniquely representing the file 1e is set as a parameter of the log acquisition commands by the version number management section 1a. The version number management section 1a generates management information 1c in which the code "c1" set in the file 1e is associated with the file name "file.c" of the file 1e.

After that, the program execution section 2a executes a program indicated e.g. by the source code in the file 1e. Note that the program execution section 2a executes a program which is translated into an execution code by compiling the source code. If the program execution section 2a is an interpreter, it is also possible to perform program execution while sequentially interpreting each statement in the source code.

When the execution of the program by the program execution section 2a reaches the stage of execution of each log acquisition command, the program execution section 2a acquires the values of variables indicated by the log acquisition commands. Then, the trace log generation section 2b generates a trace log 2d.

In the FIG. 3 example, the trace log 2d includes the items of a code, a line number, version number information, and a value of a variable. The code uniquely indicates the file 1e. The line number is a number of a line describing a log acquisition command in the source code. The version number information indicates the version number of the file 1e. The value of a variable is a value of a variable indicated by the log acquisition command in the stage of execution thereof.

In the example illustrated in FIG. 3, it is impossible to understand what is meant by the value of each variable, from the contents of the trace log 2d alone. Further, it is impossible for a person who views the code "c1" in the trace log 2d to understand which file the code "c1" indicates.

To eliminate the inconveniences, the source code acquisition section 3a acquires the source code from the file 1e corresponding to the code "c1" and version number information "v11" which are indicated in the trace log 2d. Then, the character string addition section 3b extracts character strings from the acquired source code. For example, the character string addition section 3b extracts character strings "Processing of function A is started. Parameter:" and "Error has been detected. Error number:", which explain the meanings of the values of the variables, from the log acquisition commands on lines corresponding to the line numbers indicated in respective records in the trace log 2d. Then, the character string addition section 3b generates a human-readable trace log 3d by adding the extracted character strings to the contents of the trace log 2d. Further in the FIG. 3 example, the character string addition section 3b replaces the code "c1" in the trace log 2d by the file name "file.c" of the file corresponding to the code.

As described above, according to the first embodiment, since the trace log 2d includes version number information, it is possible to clearly grasp a version number of a source code based on which commands are executed to give the contents of each trace log. As a consequence, it is possible to add character strings that can be understood by human to each trace log based on information on a source code having a version number corresponding to the trace log, to thereby acquire a human-readable trace log 3d.

Further, the human-readable trace log 3d indicates the file name of a file describing the source code. Therefore, it is possible to easily grasp a file to be edited when modifying a program, thereby making it possible to reduce labor of operations for creating, executing and analyzing a trace log, and managing the program on a version number basis.

Second Embodiment

Next, the second embodiment will be described. The second embodiment transfers en execution code acquired from a source code to an execution device via a network, and acquires a trace log using the execution device.

Figure 4:
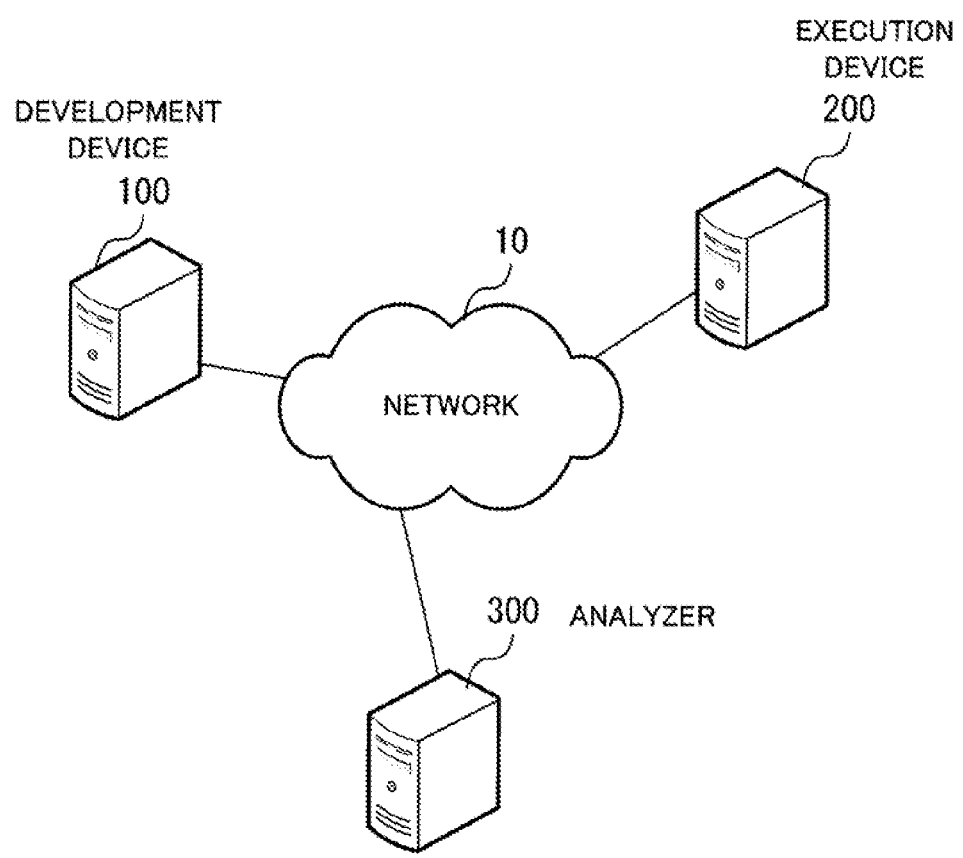
FIG. 4 illustrates an example of the configuration of a system according to a second embodiment.

FIG. 4 illustrates an example of the configuration of a system according to the second embodiment. In the second embodiment, a development device 100, the execution device 200, and an analyzer 300 are connected via the network 10.

The development device 100 is a computer used for creating software. The development device 100 is capable of incorporating a function call description (log acquisition command) for acquiring a trace log during execution of the software, in the created software. The function call description can include version number information as an argument.

The execution device 200 is a computer for executing the software created by the development device 100. The execution device 200 is capable of executing a function for acquiring the trace log based on the function call description incorporated in a program of the software. The trace log is acquired by executing the function for acquiring the trace log.

The analyzer 300 is a computer for analyzing the trace log. The analyzer 300 is capable of acquiring the trace log from the execution device 200, and converting coded information included in the trace log into information that can be interpreted by human (character strings, for example).

Figure 5:
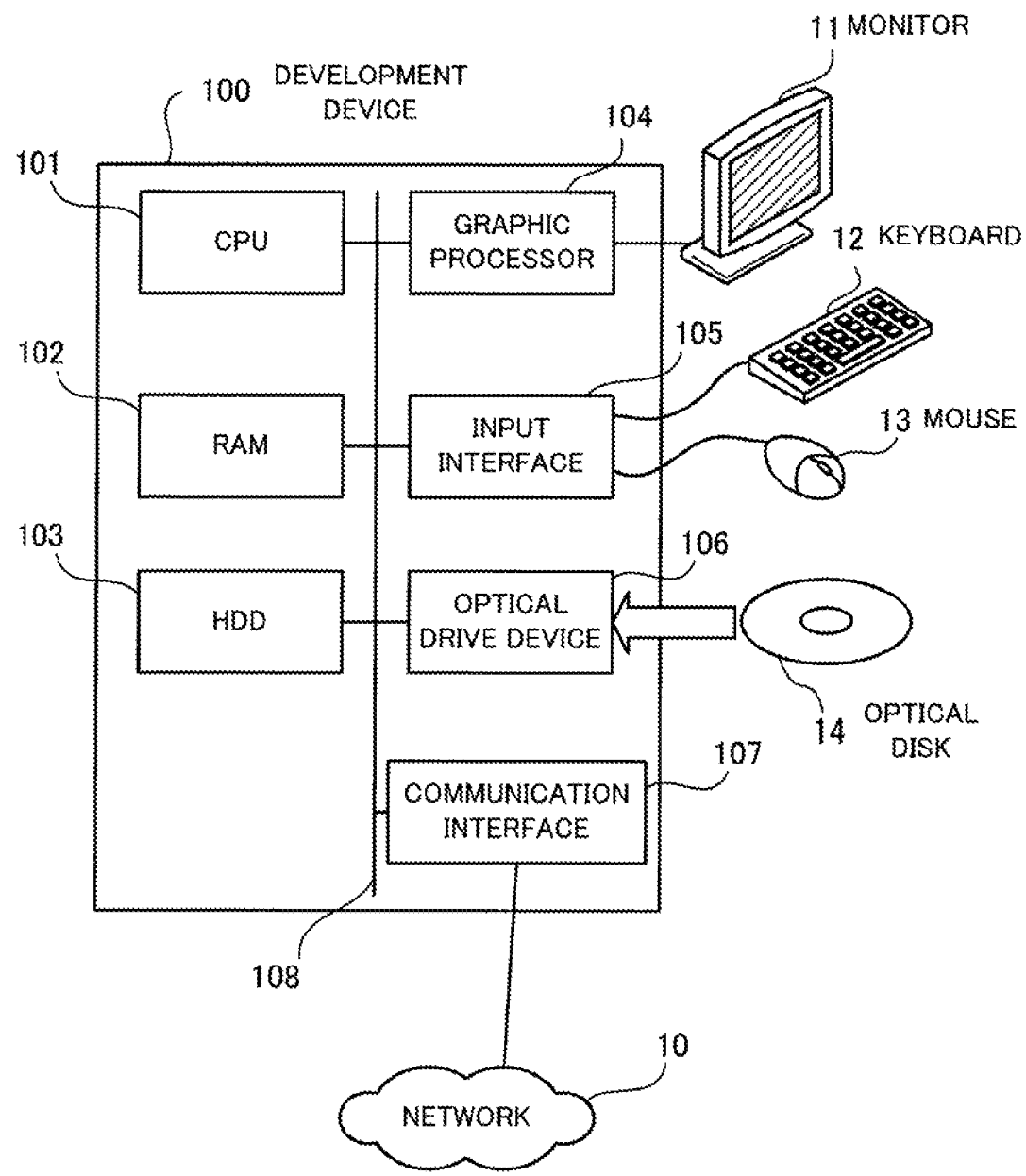
FIG. 5 illustrates an example of the hardware configuration of a development device used in the embodiment.

FIG. 5 illustrates an example of the hardware configuration of the development device used in the present embodiment. The entire development device 100 is controlled by a CPU 101. A RAM 102 and a plurality of peripheral devices are connected to the CPU 101 via a bus 108.

The RAM 102 is used as a main storage device of the development device 100. The RAM 102 temporarily stores at least part of a program of an OS (operating system) and application programs which the CPU 101 is caused to execute. Further, the RAM 102 stores various data required by the CPU 101 for processing.

As the peripheral devices connected to the bus 108, there are provided an HDD 103, a graphic processor 104, an input interface 105, an optical drive device 106, and a communication interface 107.

The HDD 103 magnetically writes and reads data in and from a disk incorporated therein. The HDD 103 is used as a secondary storage device for the development device 100. The HDD 103 stores the program of the OS, application programs, and various data. Note that a semiconductor storage device, such as a flash memory, can be used as the secondary storage device.

A monitor 11 is connected to the graphic processor 104. The graphic processor 104 displays images on the screen of the monitor 11 according to commands from the CPU 101. Examples of the monitor 11 include a display device using a CRT (cathode ray tube), and a liquid crystal display device.

A keyboard 12 and a mouse 13 are connected to the input interface 105. The input interface 105 transmits signals sent from the keyboard 12 and the mouse 13, to the CPU 101. The mouse 13 is an example of a pointing device, and other pointing devices than the mouse 13 can be employed. The other pointing devices include a touch panel, a tablet, a touch pad, and a trackball.

The optical drive device 106 reads data recorded on an optical disk 14, using a laser beam or the like. The optical disk 14 is a portable recording medium on which data is recorded such that the data can be read by reflected light. Examples of the optical disk 14 include a DVD (Digital Versatile Disk), a DVD-RAM, a CD-ROM (Compact Disk Read Only Memory), and a CD-R (Recordable)/RW (ReWritable).

The communication interface 107 is connected to the network 10. The communication interface 107 transmits and receives data to and from other computers or communication devices.

With the hardware configuration described above, it is possible to realize processing functions of the present embodiment. Although FIG. 5 illustrates an example of the hardware configuration of the development device 100, the execution device 200 and the analyzer 300 can each be realized by a similar hardware configuration. Further, the information processing apparatuses according to the first embodiment can each be realized by a similar hardware configuration to the development device 100 illustrated in FIG. 5.

Figure 6:
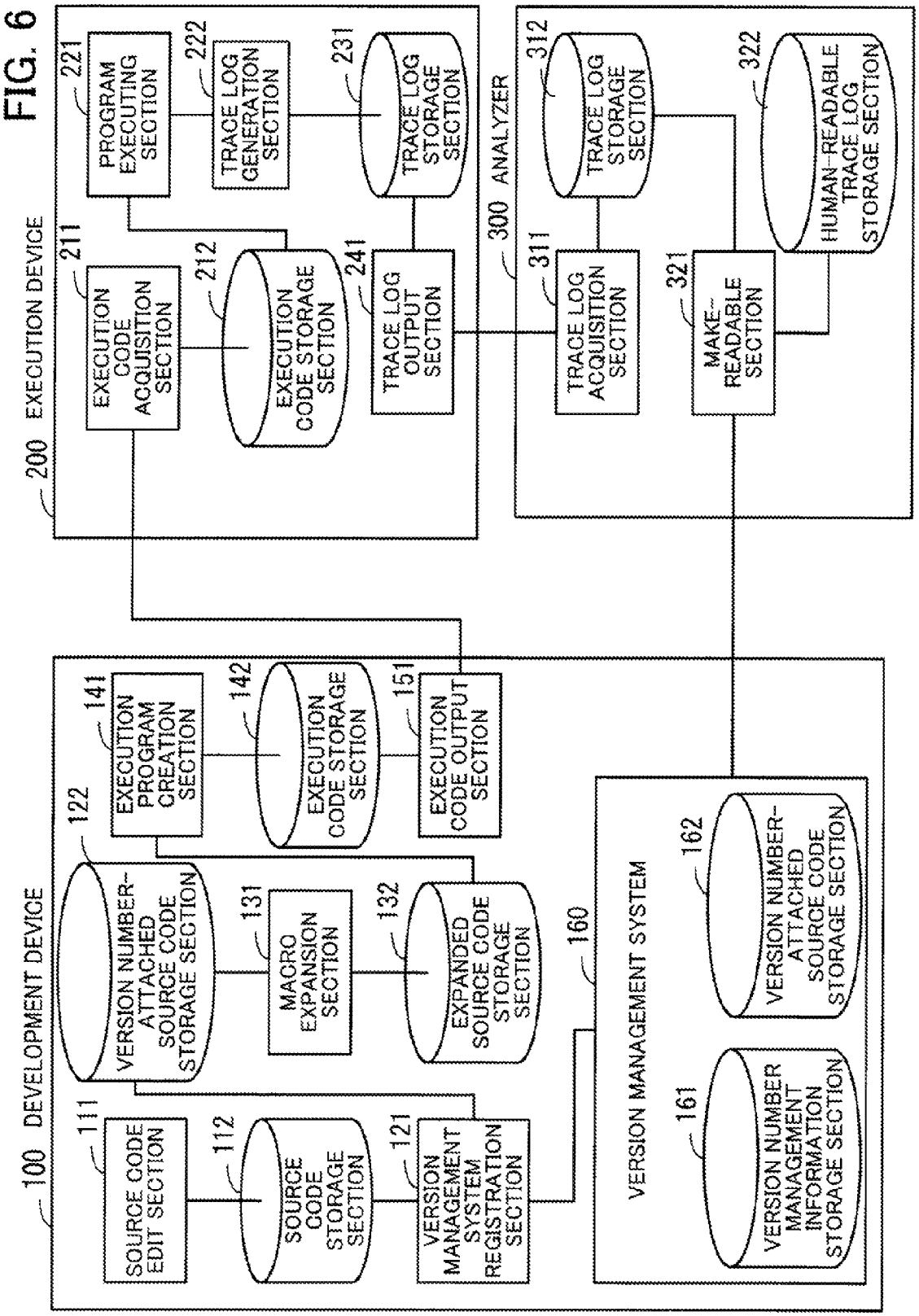
FIG. 6 is a block diagram of the functions of devices according to the second embodiment.

FIG. 6 is a functional block diagram of devices according to the second embodiment. The development device 100 includes a source code edit section 111, a source code storage section 112, a version management system registration section 121, a version number-attached source code storage section 122, a macro expansion section 131, a expanded source code storage section 132, an execution program creation section 141, an execution code storage section 142, an execution code output section 151, and a version management system 160.

The source code edit section 111 edits the source codes of programs in response to operation inputs from a programmer. The source code edit section 111 is e.g. text file-editing software which is called text editor. For example, the programmer causes a source code to include a function call description (log acquisition command) for causing a function to acquire a trace log. The log acquisition command includes e.g. a macro which is to be replaced by the line number of a line describing a log acquisition command in the source code, as a parameter. The macro is replaced or developed according to a rule defined in advance by a programming language. Further, the log acquisition command includes a character string indicative of replacement by a code (file code) uniquely indicating the file name of a file describing the source code, as a parameter. Furthermore, the log acquisition command includes a character string indicative of replacement by version number information on the source code, as a parameter. Note that the file code is information with the amount of data smaller than that of data e.g. of the character string of the file name.

The source code storage section 112 stores the source code created by the source code edit section 111. For example, part of the storage area of the main storage device, such as the RAM 102, or the secondary storage device, such as the HDD 103, is used as the source code storage section 112.

The version management system registration section 121 registers the source code stored in the source code storage section 112 in the version management system 160. In doing this, the version management system registration section 121 replaces the character string indicative of replacement by the file code by a file code corresponding to the file name of the file describing the source code. Further, the version management system registration section 121 replaces the character string indicative of replacement by the version number information by the version number information on the source code. For example, the version management system registration section 121 acquires latest version number information on a source code having the same file name from version number management information stored in the version management system 160, and sets a value obtained by adding 1 to the version number information as version number information on a source code to be newly registered. When a source code is to be registered in the version management system 160, if a source code of an old version thereof has already been registered, the version management system registration section 121 registers only the difference between the source code of the new version and the source code of the old version.

Further, the version management system registration section 121 stores the source code (version number-attached source code) obtained by replacing the associated character strings by the file code and the version number information, in the version number-attached source code storage section 122.

The version number-attached source code storage section 122 stores the version number-attached source code. For example, part of the storage area of the main storage device, such as the RAM 102, or the secondary storage device, such as the HDD 103, is used as the version number-attached source code storage section 122.

The macro expansion section 131 expands a macro included in the version number-attached source code in the version number-attached source code storage section 122. For example, the macro expansion section 131 replaces the macro to be replaced by the line number included in the log acquisition command, by the line number included in the log acquisition command. Such a macro replacement process is called macro expansion. The macro expansion section 131 stores the version number-attached source code (expanded source code) obtained after the macro expansion, in the expanded source code storage section 132.

The expanded source code storage section 132 stores the expanded source code. For example, part of the storage area of the main storage device, such as the RAM 102, or the secondary storage device, such as the HDD 103, is used as the expanded source code storage section 132.

The execution program creation section 141 compiles and links the source code to thereby create an execution code described in a machine language. The execution program creation section 141 stores the created execution code in the execution code storage section 142.

The execution code storage section 142 stores the execution code created in the execution program creation section 141. For example, part of the storage area of the main storage device, such as the RAM 102, or the secondary storage device, such as the HDD 103, is used as the execution code storage section 142.

The execution code output section 151 outputs the execution code stored in the execution code storage section 142 to the execution device 200. For example, the execution code output section 151 responds to an execution code acquisition request sent from the execution device 200 via the network 10, and transmits the execution code to the execution device 200 via the network 10.

The version management system 160 manages the version number of the created program. For example, the version management system 160 includes a version number management information storage section 161 and a version number-attached source code storage section 162.

The version number management information storage section 161 stores the version number management information. The version number management information indicates the correspondence between a file name of a file describing a source code, a file code, and a version number of the source code. For example, part of the storage area of the main storage device, such as the RAM 102, or the secondary storage device, such as the HDD 103, is used as the version number management information storage section 161.

The version number-attached source code storage section 162 stores the version number-attached source code. Note that the version number-attached source code stored in the version number-attached source code storage section 162 is e.g. difference information between a version number-attached source code of a new version and a version number-attached source code of an old version.

Further, the version management system 160 is capable of transmitting the contents of the version number management information and the version number-attached source code to the analyzer 300. For example, the version management system 160 transmits, in response to a request from the analyzer 300, the contents of the version number management information and the contents of a log acquisition command included in the version number-attached source code, to the analyzer 300 via the network 10.

The execution device 200 includes an execution code acquisition section 211, an execution code storage section 212, a program executing section 221, a trace log-generating section 222, a trace log storage section 231, and a trace log output section 241.

The execution code acquisition section 211 acquires the execution code of a program from the development device 100. For example, in response to an input from a user of the execution device 200, the execution code acquisition section 211 transmits an execution code acquisition request to the development device 100 via the network 10. Then, the execution code acquisition section 211 acquires an execution code sent from the development device 100 in response to the execution code acquisition request. The execution code acquisition section 211 stores the acquired execution code in the execution code storage section 212.

The execution code storage section 212 stores the execution code. For example, part of the storage area of a main storage device, such as a RAM in the execution device 200, or a secondary storage device, such as an HDD, of the execution device 200, is used as the execution code storage section 212.

The program executing section 221 executes the program represented by the execution code stored in the execution code storage section 212. Further, during execution of the execution code, when the log acquisition command is to be executed, the program executing section 221 starts the trace log-generating section 222, and passes the parameter of the log acquisition command to the trace log-generating section 222. In doing this, if the parameter of the log acquisition command is a variable, the program executing section 221 passes the value of the variable obtained at the time of executing the log acquisition command, as a parameter, to the trace log-generating section 222.

The trace log-generating section 222 executes processing of a log trace function called in response to the log acquisition command. For example, the trace log-generating section 222 generates a trace log according to the log trace function, and stores the generated trace log in the trace log storage section 231.

The trace log storage section 231 stores the trace log. For example, part of the storage area of the main storage device, such as the RAM in the execution device 200, or a secondary storage device, such as the HDD, of the execution device 200, is used as the trace log storage section 231.

The trace log output section 241 outputs the trace log stored in the trace log storage section 231. For example, in response to a request from the analyzer 300, the trace log output section 241 transmits the trace log to the analyzer 300 via the network 10.

The analyzer 300 includes a trace log acquisition section 311, a trace log storage section 312, a make-readable section 321, and a human-readable trace log storage section 322.

The trace log acquisition section 311 acquires a trace log from the execution device 200. For example, in response to an input from an analyst, the trace log acquisition section 311 transmits a trace log acquisition request to the execution device 200 via the network 10. Then, the trace log acquisition section 311 acquires a trace log from the execution device 200 as a response to the trace log acquisition request. The trace log acquisition section 311 stores the acquired trace log in the trace log storage section 312.

The trace log storage section 312 stores the trace log. For example, part of the storage area of a main storage device, such as a RAM in the analyzer 300, or a secondary storage device, such as an HDD in the analyzer 300, is used as the trace log storage section 312.

The make-readable section 321 makes coded information in the trace log stored in the trace log storage section 312 understandable by human to thereby create a human-readable trace log. For example, in response to an input from the analyst, the make-readable section 321 acquires, from the development device 100, a human-understandable character string corresponding to the coded information in the trace log. For example, the make-readable section 321 acquires the character string of a file name corresponding to a file code from the development device 100. Further, based on a line number in the trace log, the make-readable section 321 acquires a fixed part character string in an associated line in the version number-attached source code. Then, the make-readable section 321 makes the trace log human-readable based on the information acquired from the development device 100. The make-readable section 321 stores the created human-readable trace log in the human-readable trace log storage section 322.

The human-readable trace log storage section 322 stores the human-readable trace log. For example, part of the storage area of the main storage device, such as the RAM in the analyzer 300, or the secondary storage device, such as the HDD in the analyzer 300, is used as the human-readable trace log storage section 322.

Note that the lines connecting between the elements illustrated in FIG. 6 indicate some of communication paths, and it is possible to set communication paths other than the illustrated communication paths.

Further, a function obtained by combining the functions of the version management system registration section 121 and the version management system 160 is an example of a function obtained by combining the functions of the version number management section 1a and the storage device 1b, illustrated in FIG. 1. The program executing section 221 is an example of the program execution section 2a illustrated in FIG. 1. The trace log-generating section 222 is an example of the trace log generation section 2b. The trace log storage section 231 is an example of the storage device 2c illustrated in FIG. 1. A function of the make-readable section 321 is an example of a function obtained by combining the functions of the source code acquisition section 3a and the character string addition section 3b illustrated in FIG. 1. The human-readable trace log storage section 322 is an example of the storage device 3c illustrated in FIG. 1.

In the system configured as above, first, the programmer edits the source code of a program using the source code edit section 111 of the development device 100. After completion of the edit of the program, the programmer inputs a saving request in which a file name is designated to the source code edit section 111. In response to the saving request, the source code edit section 111 creates a file with the designated file name. The file contains the created source code. Then, the source code edit section 111 stores the created file in the source code storage section 112.

Figure 7:
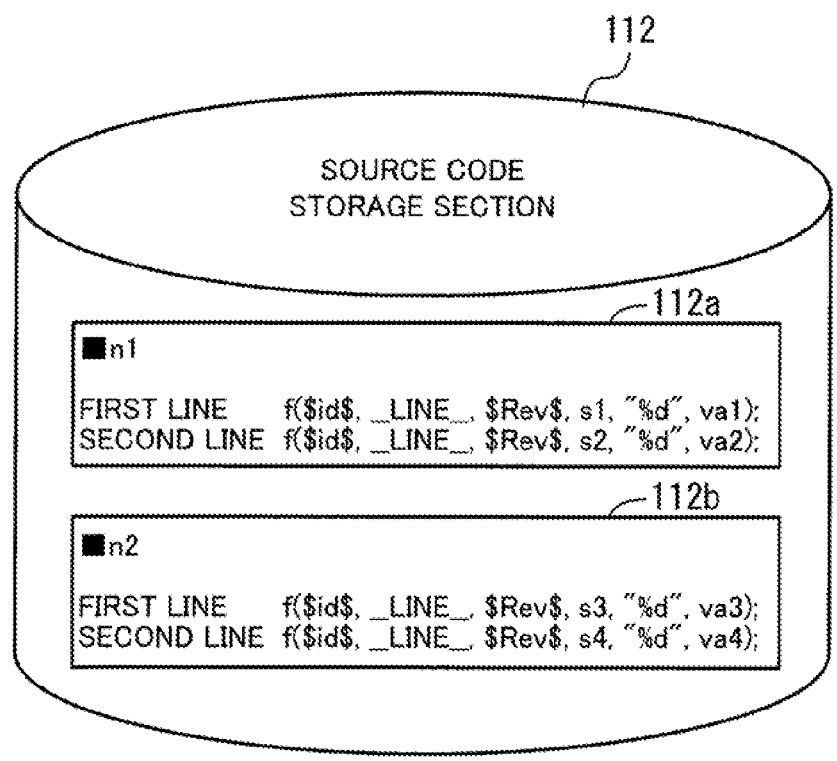
FIG. 7 illustrates an example of a data structure of a source code storage section.

FIG. 7 illustrates an example of the data structure of the source code storage section. The source code storage section 112 stores a plurality of source codes 112a and 112b each in a file format. In the example illustrated in FIG. 7, the file name of a file describing the source code 112a is "n1". Further, the file name of a file describing the source code 112b is "n2".

Note that in the FIG. 7 example, out of statements described in the source codes 112a and 112b, only those of log acquisition commands are illustrated, and the other statements are omitted. For example, the log acquisition command is a command for calling a function with a name of "f( )" (log trace function). Six parameters can be set for the command for calling the log trace function. The parameters include a first parameter, a second parameter, a third parameter, a fourth parameter, a fifth parameter, and a sixth parameter, from left to right. The meanings of the respective parameters are as follows:

First parameter: unique code of a file (file code)

"$id$" is a character string indicating conversion to a file code. The character string "$id$" is replaced by the file code by the version management system registration section 121.

Second parameter: line number

Third parameter: version number information of the file

"$Rev$" represents a character string indicating conversion to version number information on the file. The character string "$Rev$" is replaced by the version number information on the file by the version management system registration section 121.

Fourth parameter: fixed part character string of a trace log

Fifth parameter: form-attached character string of an output of a variable part of the trace log (variable part character string).

"% d" represents that a value of the sixth parameter is output in a decimal system.

Sixth parameter: variable corresponding to the fifth parameter.

The programmer creates a source code including such log acquisition commands as described above, whereby it is possible to acquire a trace log during execution of an execution code generated from the source code.

Note that there a device, such as an incorporated device, a storage medium of which has a small capacity, is sometimes used as the execution device 200. Therefore, in the second embodiment, to preserve a larger amount of information, there are devised methods of reducing memory capacity required per trace log. For example, the amount of data of each trace log is reduced by the following two methods:

Coding of character strings of each trace log;

Dividing the contents of the trace log into "fixed parts" and "variable parts", and thereby storing only the variable parts in an execution environment Coding of character strings of each trace log is e.g. setting not a file name but a code corresponding to the file name as the first parameter of a log acquisition command in the trace log. Further, dividing the contents of the trace log into "fixed parts" and "variable parts", and thereby storing only the variable parts in an execution environment is e.g. eliminating the fourth parameter of the log acquisition command from contents to be stored in the trace log.

After storage of the source code 112a and 112b in the source code storage section 112, the programmer instructs the development device 100 to register the source code 112a and 112b in the version management system 160. Then, the version management system registration section 121 replaces the third parameter of the log acquisition command of the source code 112a and 112b in the source code storage section 112 by the version number information, and registers the third parameter in the version management system 160. The version number-attached source code registered in the version management system 160 is stored in the version number-attached source code storage section 162.

Figure 8:
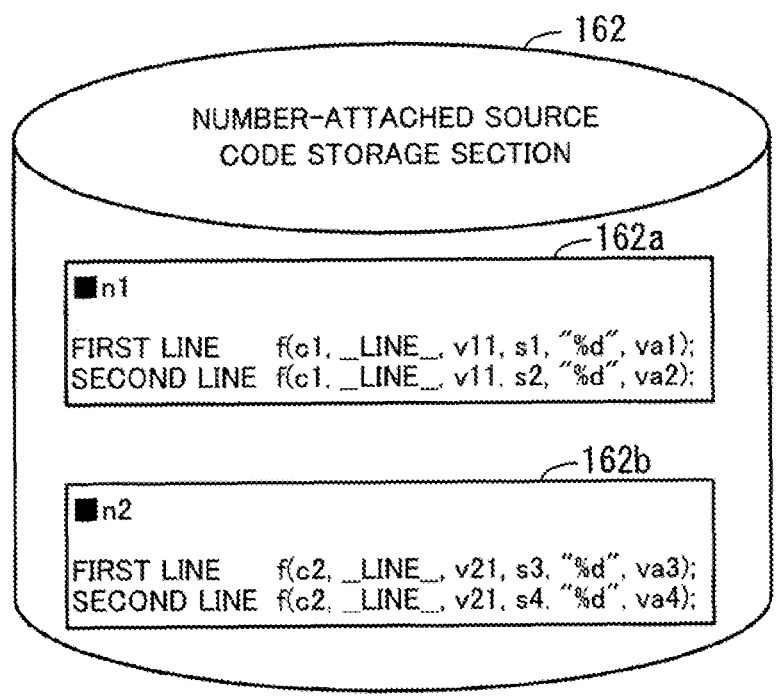
FIG. 8 illustrates an example of a data structure of a version number-attached source code storage section of a version management system.

FIG. 8 illustrates an example of a data structure of the version number-attached source code storage section of the version management system. The version number-attached source code storage section 162 stores version number-attached source codes 162a and 162b corresponding to the respective source codes 112a and 112b stored in the source code storage section 112. The version number-attached source codes 162a and 162b are different from the respective source codes 112a and 112b in the first and third parameters of the log acquisition command.

In the version number-attached source codes 162a and 162b, the first parameter of the log acquisition command is converted to a file code uniquely indicating the version number-attached source codes 162a and 162b. Further, the third parameter of the log acquisition command is converted to a character string indicating version numbers of the version number-attached source codes 162a and 162b.

Although in FIG. 8, an example of the data structure of the version number-attached source code storage section 162 in the version management system 160 is illustrated, a data structure of the version number-attached source code storage section 122 is the same as the data structure illustrated in FIG. 8. Further, as for the version number-attached source code storage section 162 in the version management system 160, when there is a version number-attached source code of a past version number, which has the same source code file name, the difference between the current version number-attached source code and the past version number-attached source code is stored in the version number-attached source code storage section 162.

The version management system 160 manages the version number-attached source codes 162a and 162b stored in the version number-attached source code storage section 162 using the version number management information storage section 161.

Figure 9:
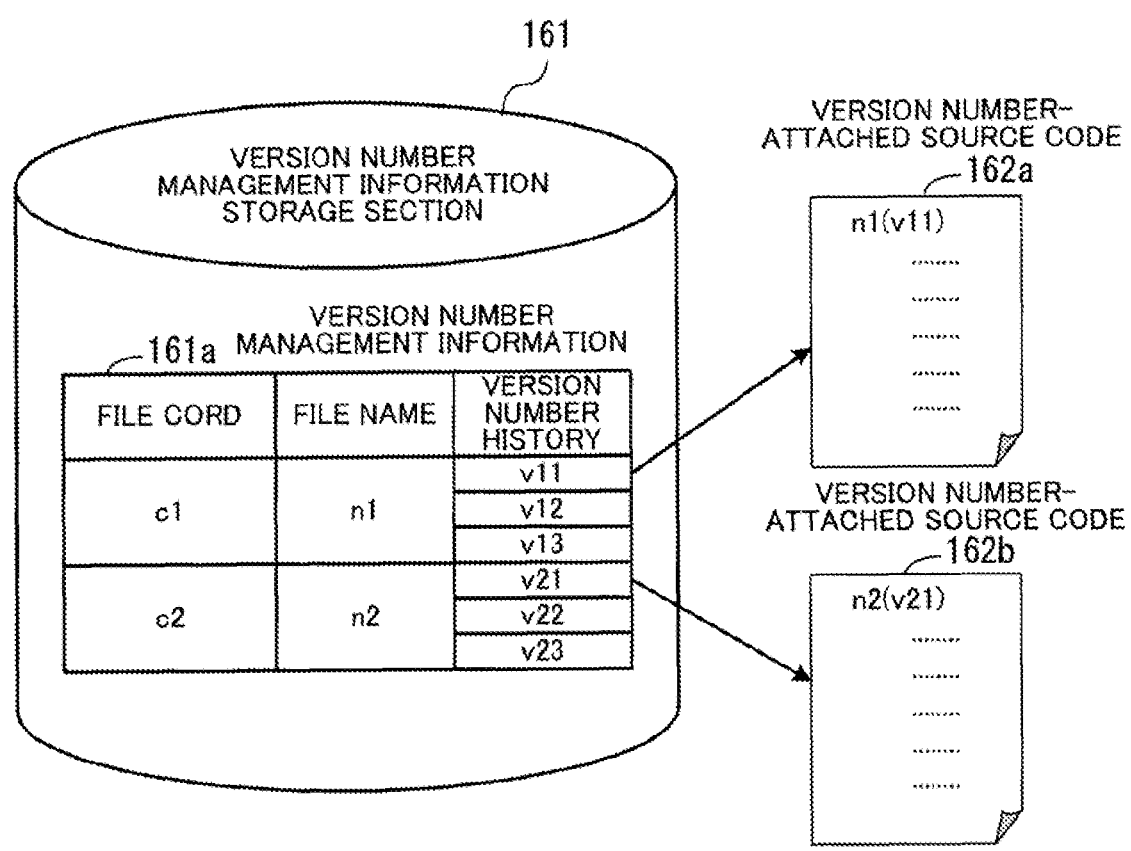
FIG. 9 illustrates an example of a data structure of a version number management information storage section of the version management system.

FIG. 9 illustrates an example of a data structure of the version number management information storage section of the version management system. The version number management information storage section 161 stores version number management information 161a.

The version number management information 161a is provided with a file cord column, a file name column, and a version number history column. In the file cord column, file cords uniquely indicating respective file names are set. In the file name column, the file names of files describing respective version number-attached source codes are set in association with the file cords, respectively. In the version number history column, there are set version number information on the version number-attached source codes of files generated with a file name indicated by each associated file cord. Each version number information item set in the version number history column is associated with a version number-attached source code matching in file name and version number.

For example, in the FIG. 9 example, a file code "c1" is associated with a file name "n1". As for version number-attached source codes created with the file name of "n1", there are three version number information items of "v11", "v12", and "v13". As the value following "v" is lager, the version number information indicates that the version number is newer. Each version number-attached source code is uniquely associated with a combination of a file name and a version number information item.

After the programmer has completed registration of the version number-attached source codes in the version management system 160 and storage of the version number-attached source codes in the version number-attached source code storage section 122, the programmer inputs an instruction for causing the development device 100 to perform macro expansion. The macro expansion section 131 performs macro expansion of the version number-attached source codes stored in the version number-attached source code storage section 122. In the macro expansion, a second parameter in a log acquisition command, for example, is replaced by the line number of a line describing the log acquisition command. Then, a expanded source code having been subjected to the macro expansion is stored in the expanded source code storage section 132.

Figure 10:
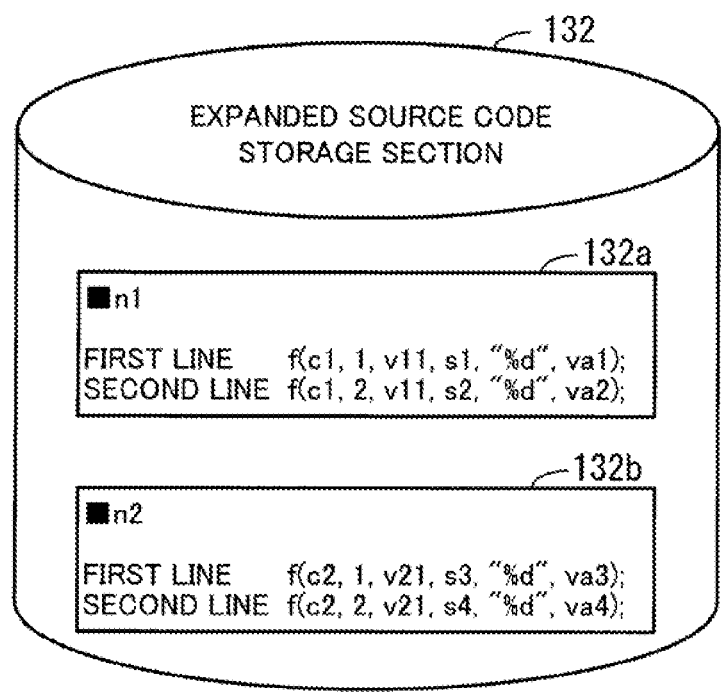
FIG. 10 illustrates an example of a data structure of an expanded source code storage section.

FIG. 10 illustrates an example of a data structure of the expanded source code storage section. The expanded source code storage section 132 stores expanded source codes 132a and 132b corresponding to the respective version number-attached source codes (having the same contents as the version number-attached source codes 162a and 162b illustrated in FIG. 9) stored in the version number-attached source code storage section 122. The expanded source codes 132a and 132b are different from the respective version number-attached source codes 162a and 162b in the second parameter of the log acquisition command.

In the expanded source codes 132a and 132b, the second parameter of the log acquisition command is expanded into a line number. For example, in the log acquisition command described on the first line of the expanded source code 132a, the second parameter is converted to a value of "1" indicative of the line number.

The thus expanded source codes 132a and 132b are compiled by the execution program creation section 141, whereby object files corresponding to the respective expanded source codes 132a and 132b are created. Then, the execution program creation section 141 links the object files to thereby create a single execution code. The created execution code is stored in the execution code storage section 142.

The execution code stored in the execution code storage section 142 is transmitted to the execution device 200 by the execution code output section 151.

The execution code transmitted from the development device 100 is received by the execution code acquisition section 211 of the execution device 200. The execution code acquisition section 211 stores the received execution code in the execution code storage section 212. After that, the program executing section 221 executes a program represented by the execution code according to e.g. an input from the user using the execution device 200.

Figure 11:
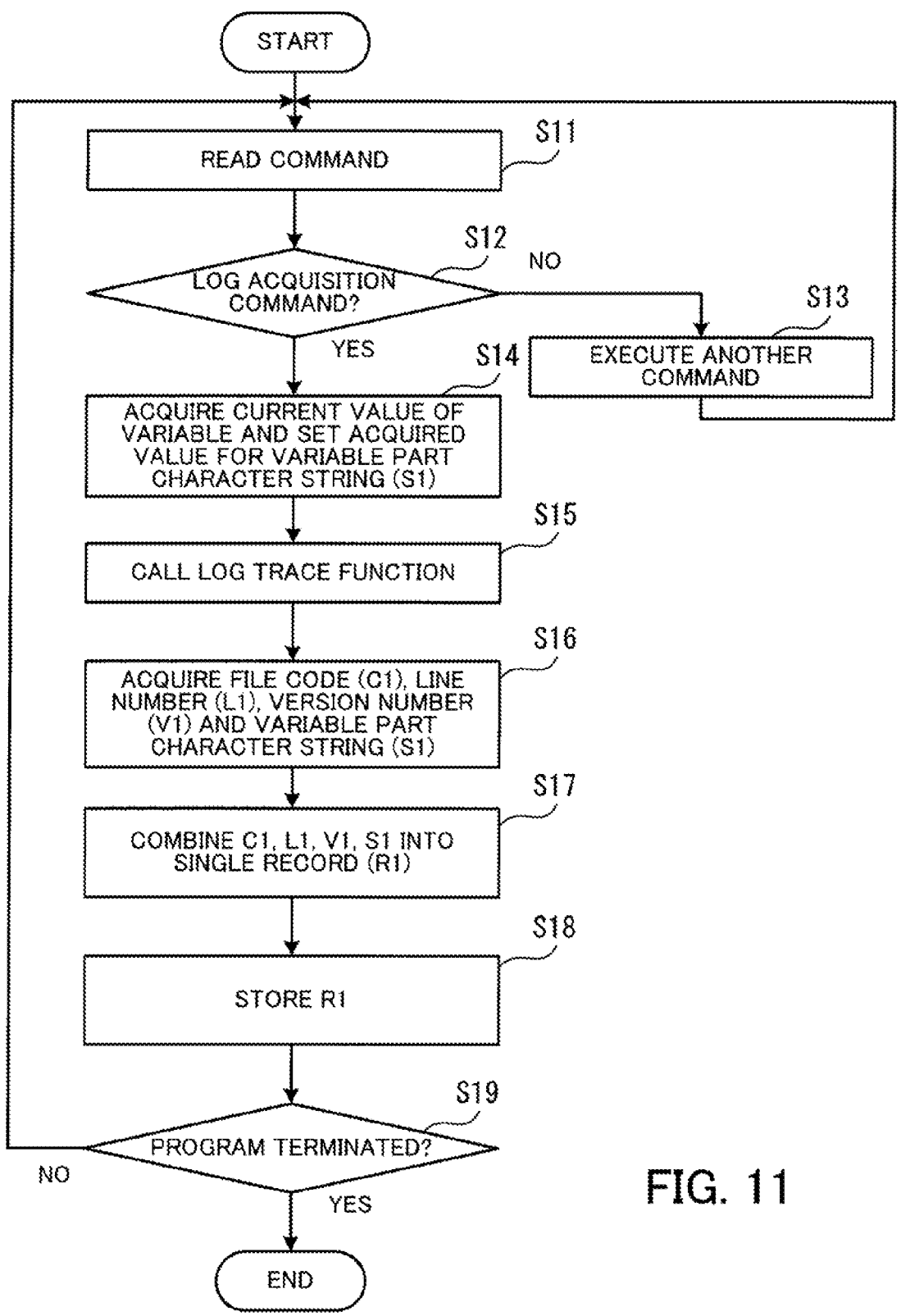
FIG. 11 is a flowchart of a program execution process.

FIG. 11 is a flowchart of a program execution process. Hereinafter, a description will be given of the FIG. 11 process in order of step number.

[Step S11] The program executing section 221 sequentially reads commands described in the execution code from the above.

[Step S12] The program executing section 221 determines whether or not a read command is a log acquisition command. If the read command is a log acquisition command, the program executing section 221 causes the process to proceed to a step S14. On the other hand, if the read command is a command other than a log acquisition command, the program executing section 221 causes the process to proceed to a step S13.

[Step S13] The program executing section 221 executes the read command, and then causes the process to proceed to the step S11.

[Step S14] If the read command is a log acquisition command, the program executing section 221 acquires a current value of a variable indicated by the sixth parameter of the log acquisition command, and sets the acquired value of the variable in place of the variable part character string. In doing this, the trace log-generating section 222 sets the value of the variable in a format (decimal in this example) indicated by the variable part character string ("% d" in this example).

[Step S15] The program executing section 221 calls a log trace function. This calling of the log trace function starts the trace log-generating section 222. At this time, the program executing section 221 passes a parameter set in the log acquisition command to the trace log-generating section 222.

[Step S16] The trace log-generating section 222 acquires the first, second, third, and fifth parameters of the log acquisition command. For example, the trace log-generating section 222 acquires a file code of the first parameter indicated in the log acquisition command. Hereinafter, it is assumed that the acquired file code is represented by "C1". Further, the trace log-generating section 222 acquires a line number of the second parameter indicated in the log acquisition command. Hereinafter, it is assumed that the acquired line number is represented by "L1". Further, the trace log-generating section 222 acquires version number information of the third parameter indicated in the log acquisition command. Hereinafter, it is assumed that the acquired version number information is represented by "V1". Further, the trace log-generating section 222 acquires a variable part character string of the fifth parameter indicated in the log acquisition command. Hereinafter, it is assumed that the acquired variable part character string is represented by "S1".

[Step S17] The trace log-generating section 222 combines the file code "C1", the line number "L1", the version number information "V1", and the variable part character string "S1" into a single record "R1".

[Step S18] The trace log-generating section 222 adds the record "R1" to the trace log storage section 231, for storage.

[Step S19] The program executing section 221 determines whether or not the program indicated by the execution code has been terminated. If the program has been terminated, the program executing section 221 terminates the program execution process. If the program has not been terminated, the program executing section 221 causes the process to proceed to the step S11.

The trace log is thus acquired along with execution of the program represented by the execution code.

Figure 12:
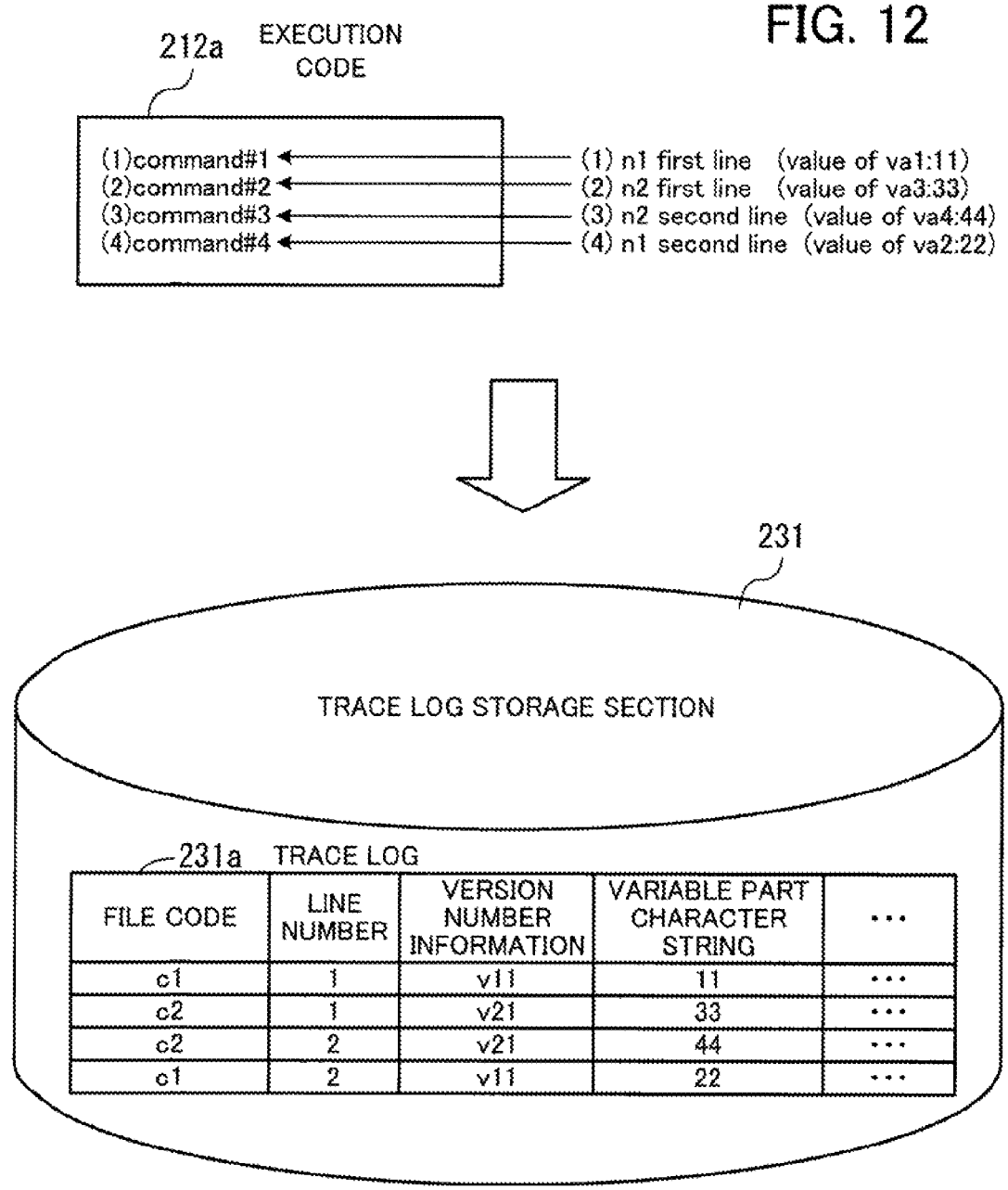
FIG. 12 illustrates an example of a data structure of a trace log.

FIG. 12 illustrates an example of a data structure of the trace log. Note that in FIG. 12, a trace log 231a acquired by execution of an execution code 212a is illustrated. The execution code 212a illustrated in FIG. 12 describes a plurality of commands generated based on statements in the expanded source codes 132a and 132b, in a machine language interpretable by the CPU of the execution device 200.

A first command "command#1" represents a machine language command corresponding to a log acquisition command on a first line of an expanded source code with a file name "n1". A value of "11" of a variable "va1" is acquired by execution of the first command "command#1".

A second command "command#2" is a machine language command corresponding to a log acquisition command on a first line of an expanded source code with a file name "n2". A value of "33" of a variable "va3" is acquired by execution of the second command "command#2".

A third command "command#3" is a machine language command corresponding to a log acquisition command on a second line of the expanded source code with the file name "n2". A value of "44" of a variable "va4" is acquired by execution of the third command "command#3".

A fourth command "command#4" is a machine language command corresponding to a log acquisition command on a second line of the expanded source code with the file name "n1". A value of "22" of a variable "va2" is acquired by execution of the fourth command "command#4".

By execution of the above execution code 212a, the trace log 231a is stored in the trace log storage section 231. The trace log 231a is provided with a file cord column, a line number column, a version number information column, and a variable part character string column.

A file code indicated by the first parameter of the log acquisition command is set in the file cord column. A line number indicated by the second parameter of the log acquisition command is set in the line number column. Version number information indicated by the third parameter of the log acquisition command is set in the version number information column. A value of the variable acquired by execution of the log acquisition command is set in the variable part character string column.

As described above, by causing the version number information to be included in the trace log 231a, it is possible to determine the version number of the source code of the program that has been executed during acquiring and writing each record into the trace log 231a. This makes it possible to facilitate analysis of the operating conditions of the program based on the trace log 231a. For example, by adding character strings to the trace log 231a based on the source code such that the trace log 231a can be easily understood by human, an analyst can easily grasp the operating conditions.

Analysis of the trace log storage section 231 is performed e.g. by the analyzer 300. In this case, the trace log 231a stored in the trace log storage section 231 is transmitted to the analyzer 300 by the trace log output section 241. In the analyzer 300, the trace log acquisition section 311 acquires the trace log 231a sent from the execution device 200. The trace log 231a acquired by the trace log acquisition section 311 is stored in the trace log storage section 312.

Figure 13:
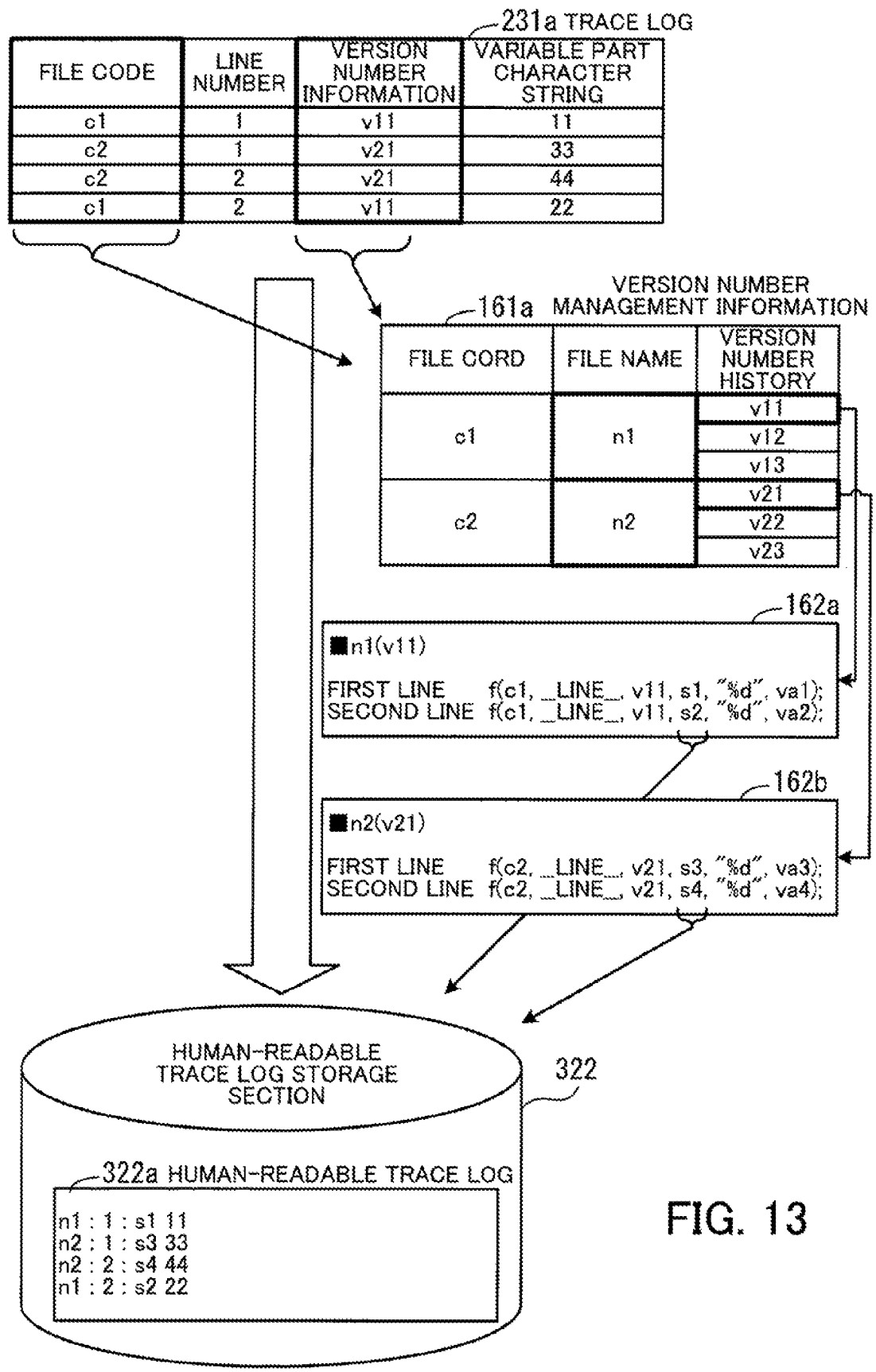
FIG. 13 illustrates a make-readable process.

After that, the make-readable section 321 performs a make-readable process that makes the trace log 231a human-readable;

FIG. 13 illustrates the make-readable process. To make the trace log 231a human-readable, the make-readable section 321 acquires the version number management information 161a and the version number-attached source codes 162a and 162b from the development device 100.

The make-readable section 321 extracts a combination of a file code and version number information of each record from the trace log 231a. Then, the make-readable section 321 acquires a file name corresponding to the file code extracted from the trace log 231a, from the version number management information 161a. Further, the make-readable section 321 refers to a version number-attached source code with a version number indicated by version number information corresponding to the file code extracted from the trace log 231a, out of version number-attached source codes of the acquired file name. Next, the make-readable section 321 acquires a fixed part character string from the corresponding version number-attached source code.

The make-readable section 321 replaces the file code included in the record of the trace log 231a by the file name acquired from the version number management information 161a. Further, the make-readable section 321 adds the fixed part character string acquired from the version number-attached source code, to the record of the trace log 231a. Then, the make-readable section 321 stores the changed record in the human-readable trace log storage section 322. As a consequence, a human-readable trace log 322a described in a manner such that the human-readable trace log 322a can be understood by human is stored in the human-readable trace log storage section 322.

In the FIG. 13 example, records each including a file name, a line number, a fixed part character string, and a variable part character string are registered in the human-readable trace log 322a. For example, a first record "n1:1:s1 11" in the human-readable trace log 322a represents information of the file name "n1", the line number "1", the fixed part character string "s1", and the variable part character string "11".

Next, the make-readable process will be described in detail.

Figure 14:
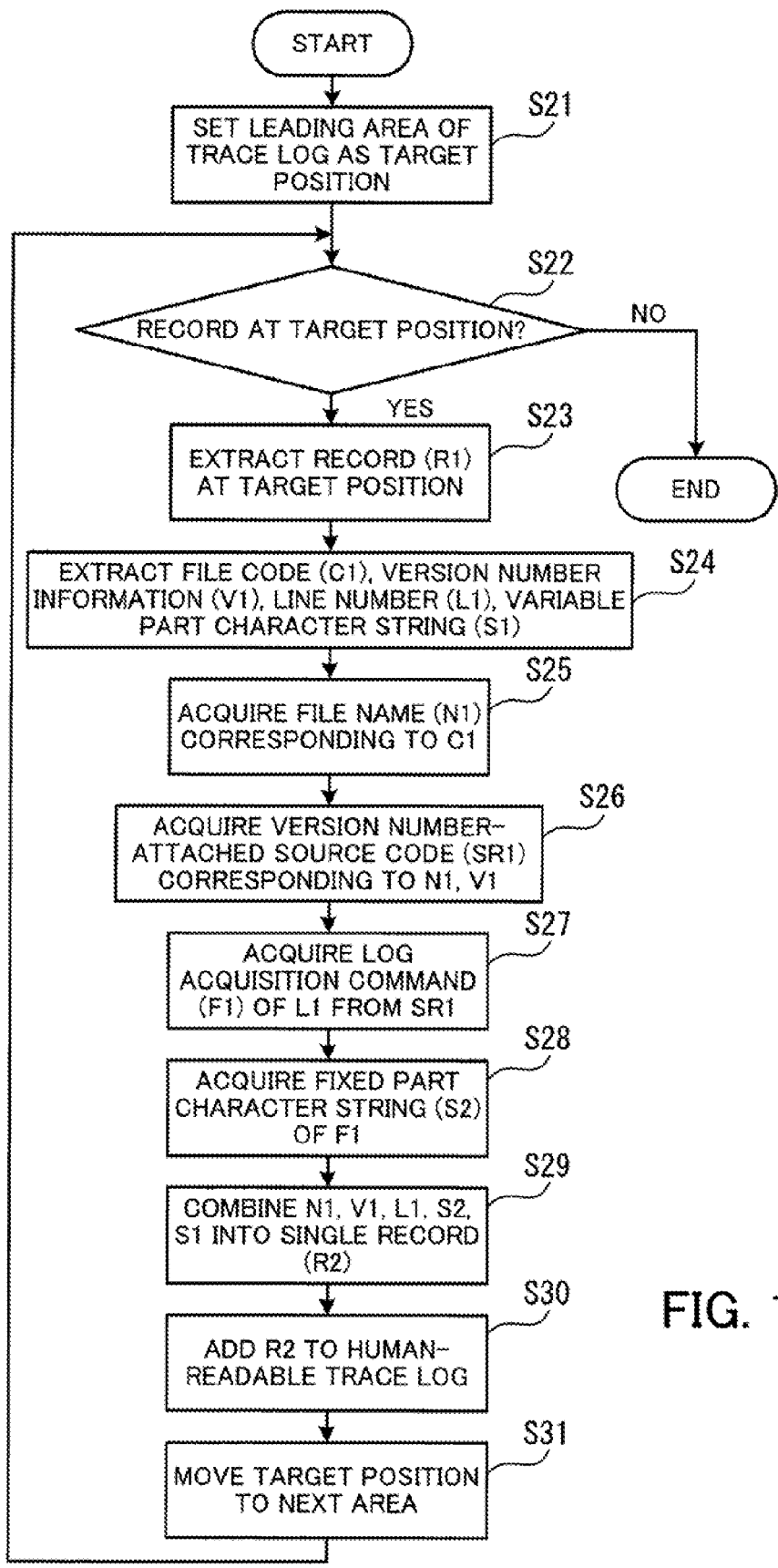
FIG. 14 is a flowchart of the make-readable process.

FIG. 14 is a flowchart of the make-readable process. Hereinafter, a description will be given of the FIG. 14 process in the order of step numbers.

[Step S21] The make-readable section 321 sets a record storage area at a leading portion of the trace log storage section 312 as a processing target position.

[Step S22] The make-readable section 321 determines whether or not a record is registered at the processing target position. If a record is registered at the processing target position, the make-readable section 321 causes the process to proceed to a step S23. Further, if a record is not registered at the processing target position, the make-readable section 321 terminates the make-readable process.

[Step S23] The make-readable section 321 extracts a record registered at the processing target position. The extracted record is referred to as "R1".

[Step S24] The make-readable section 321 extracts the file code "C1" from the record "R1". Further, the make-readable section 321 extracts the version number information "V1" from the record "R1". Further, the make-readable section 321 extracts the line number "L1" from the record "R1". Furthermore, the make-readable section 321 extracts the variable part character string "S1" from the record "R1".

[Step S25] The make-readable section 321 acquires a file name corresponding to the file code "C1". Hereinafter, the acquired file name is referred to as "N1". For example, the make-readable section 321 designates the file code "C1", and transmits a request for acquiring a corresponding file name to the version management system 160 of the development device 100. Then, the version management system 160 searches the version number management information 161a (see FIG. 9) for a file code matching the file code "C1", and acquires the file name "N1" corresponding to the file code found by the search. The version management system 160 transmits the acquired file name "N1" to the analyzer 300. The make-readable section 321 acquires the file name "N1" sent from the development device 100.

[Step S26] The make-readable section 321 acquires a version number-attached source code corresponding to a combination of the file name "N1" and the version number information "V1". Hereinafter, the acquired version number-attached source code is represented by "SR1". For example, the make-readable section 321 designates the combination of the file name "N1" and the version number information "V1", and transmits a request for acquiring a corresponding version number-attached source code to the version management system 160 of the development device 100. The version management system 160 acquires a version number-attached source code "SR1" corresponding to the designated combination of the file name "N1" and the version number information "V1", from the version number-attached source code storage section 162. Then, the version management system 160 transmits the acquired version number-attached source code "SR1" to the analyzer 300. The make-readable section 321 acquires the version number-attached source code "SR1" sent from the development device 100.

[Step S27] The make-readable section 321 acquires a log acquisition command of the line number "L1" (command for calling the trace log function) from the acquired version number-attached source code "SR1". Hereinafter, the acquired log acquisition command is referred to as "F1".

[Step S28] The make-readable section 321 acquires a fixed part character string of the log acquisition command "F1". Hereinafter, the acquired fixed part character string is referred to as "S2". For example, the make-readable section 321 acquires a fourth parameter of the log acquisition command "F1" as the fixed part character string "S2".

[Step S29] The make-readable section 321 combines the file name "N1", the version number information "V1", the line number "L1", the fixed part character string "S2", and the variable part character string "S1" into a single record. Hereinafter, the record generated by data linkage is represented by "R2".

[Step S30] The make-readable section 321 adds the record "R2" to the human-readable trace log 322a, for storage.

[Step S31] The make-readable section 321 moves the processing target position in the trace log 231a to the next record storage area. Then, the make-readable section 321 causes the process to proceed to the step S22.

The contents of each record registered in the trace log 231a can be thus made human-readable such that the contents can be understood by human. What is more, each trace log indicates the version number of a source code describing a log acquisition command corresponding to the trace log, and hence even if there are source codes with a plurality of version numbers, a fixed part character string can be acquired from a source code with a correct version number.

Hereinafter, acquisition of a trace log and making the trace log readable according to the second embodiment will be described using examples.

Figure 15:
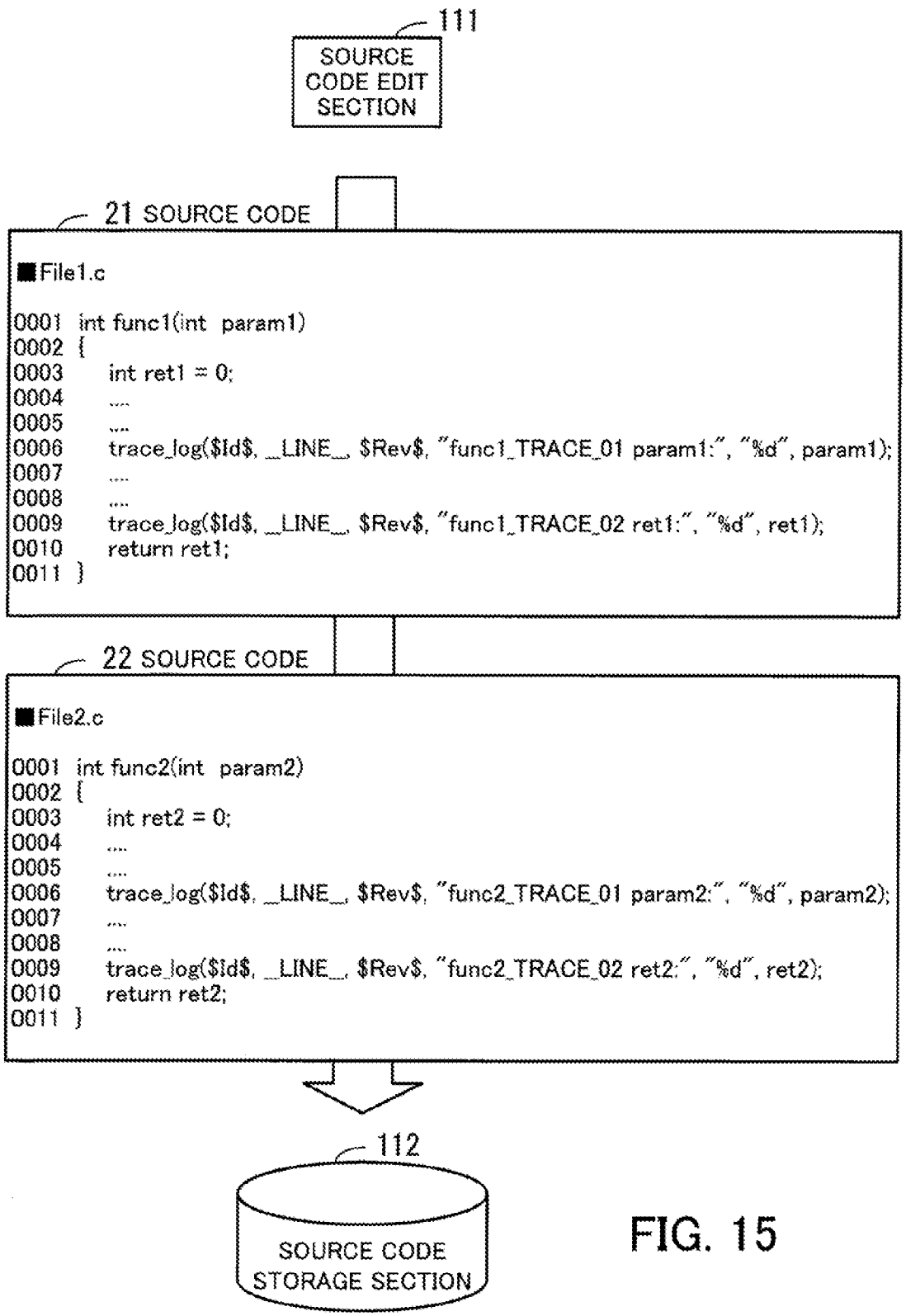
FIG. 15 illustrates examples of source codes.

FIG. 15 illustrates examples of source codes. A source code 21 illustrated in FIG. 15 is stored in a file with a file name of "File1.c". Further, a source code 22 is stored in a file with a file name of "File2.c". These files are created by the source code edit section 111, and are stored in the source code storage section 112.

In the examples of FIG. 15, the function name of the trace log function is "trace_log( )". In the source code 21, commands for calling trace log functions (log acquisition commands) are described on sixth and ninth lines. In the source code 22 as well, commands for calling trace log functions (log acquisition commands) are described on sixth and ninth lines.

When registering the source codes 21 and 22 in the version management system 160, the version management system registration section 121 replaces third parameters in the respective log acquisition commands thereof by version number information.

Figure 16:
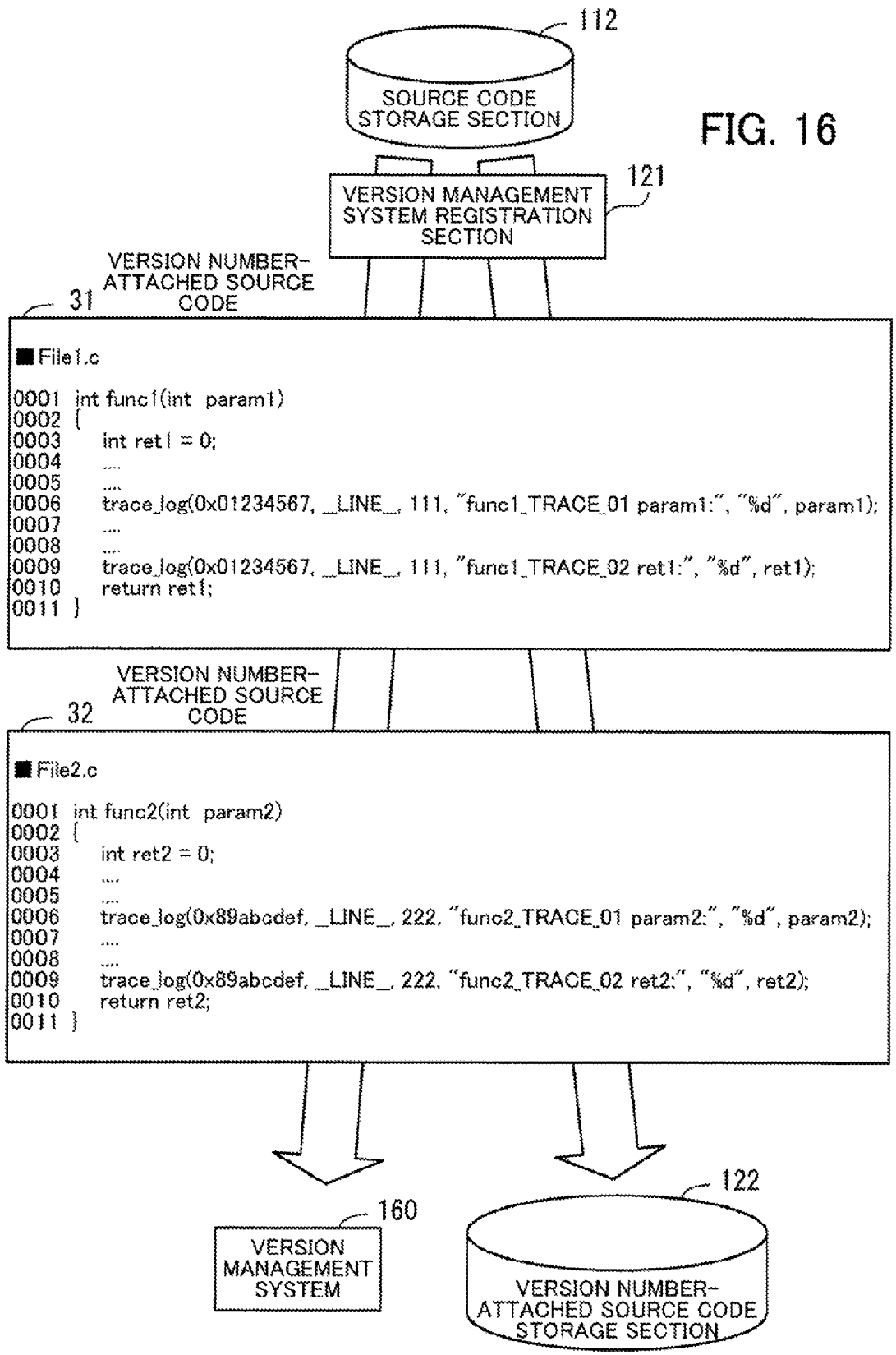
FIG. 16 illustrates examples of version number-attached source codes.

FIG. 16 illustrates examples of the version number-attached source code. In version number-attached source codes 31 and 32, the first parameters of the log acquisition commands in the source codes 21 and 22 illustrated in FIG. 15 are replaced by file codes uniquely associated with the respective file names. For example, in the version number-attached source code 31, the first parameter of the trace log function "trace_log( )" is set to a file code "0x01234567" corresponding to a file name "File1". Further, in the version number-attached source code 32, the first parameter of the trace log function "trace_log( )" is set to a file code "0x89abcdef" corresponding to a file name "File2".

Further, in the version number-attached source codes 31 and 32, the third parameters of the log acquisition commands in the source codes 21 and 22 illustrated in FIG. 15 are replaced by version number information. For example, in the version number-attached source code 31, the third parameter of the trace log function "trace_log( )" is set to version number information "111". Further, in the version number-attached source code 32, the third parameter of the trace log function "trace_log( )" is set to version number information "222".

The version number-attached source codes 31 and described above are registered in the version management system 160, and are stored in the version number-attached source code storage section 122.

In the version management system 160, the version number management information 161a is updated in response to the registration of the version number-attached source codes 31 and 32.

Figure 17:
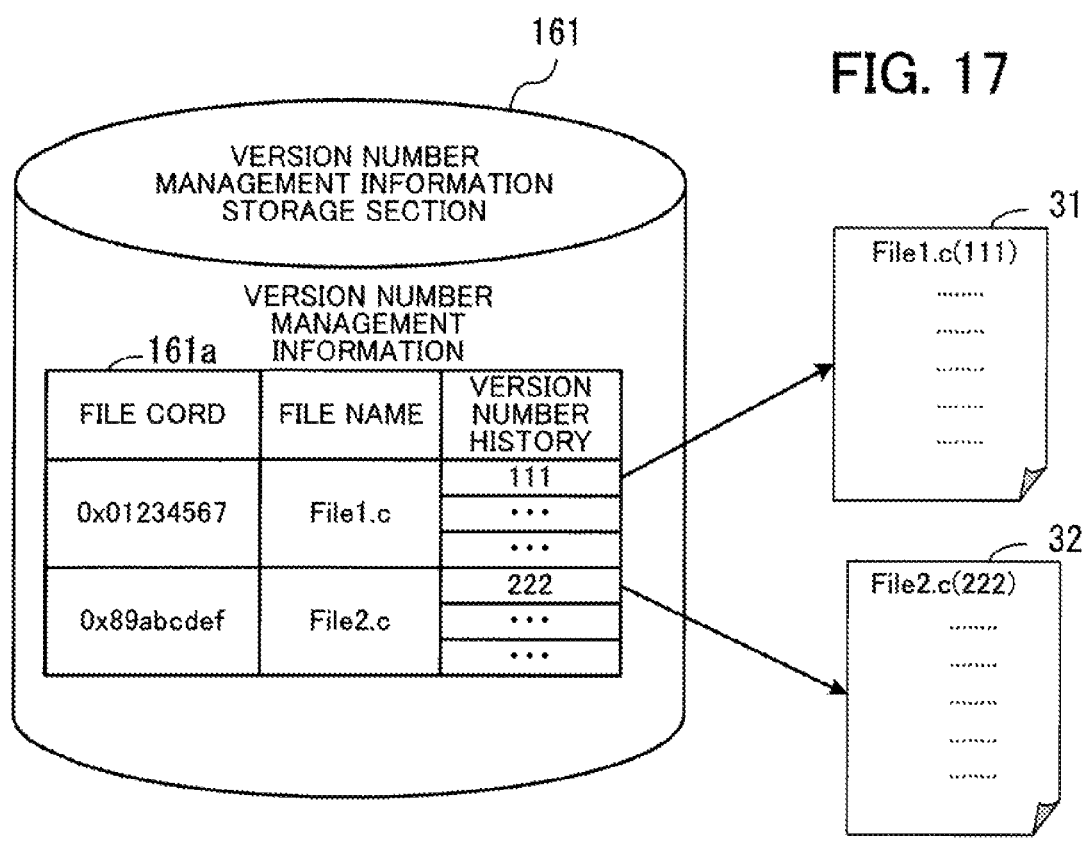
FIG. 17 illustrates an example of version number management information.

FIG. 17 illustrates an example of the version number management information. In the version number management information 161a, the version number information on the registered version number-attached source codes 31 and 32 is registered in a version number history column.

The version number-attached source codes 31 and stored in the version number-attached source code storage section 122 have line numbers thereof expanded by the macro expansion section 131, and are thereby formed into expanded source codes.

Figure 18:
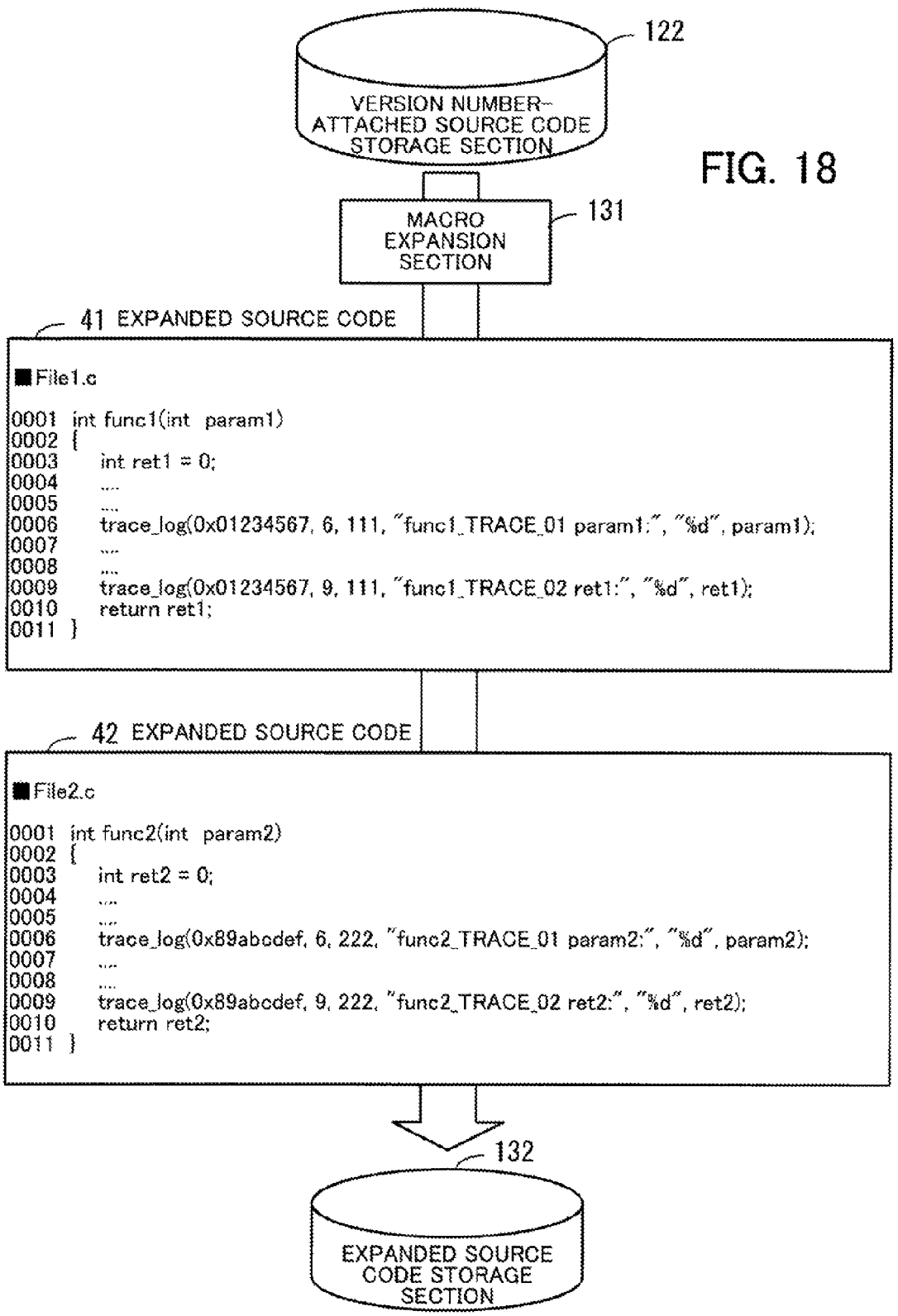
FIG. 18 illustrates examples of expanded source codes.

FIG. 18 illustrates examples of the expanded source code. In expanded source codes 41 and 42, the second parameter of each trace log function "trace_log( )" in the version number-attached source codes 31 and 32 is replaced by the line number of a line describing an associated trace log function including the second parameter. For example, in the expanded source code 41, the second parameter of a trace log function "trace_log( )" on a sixth line is set to "6", and the second parameter of a trace log function "trace_log( )" on a ninth line is set to "9".

The expanded source codes 41 and 42 thus generated are stored in the expanded source code storage section 132. The expanded source codes 41 and 42 are converted to an execution code by the execution program creation section 141. The generated execution code is passed to the execution device 200 and is executed by the program executing section 221. Then, a trace log is acquired by the trace log-generating section 222 of the program executing section 221.

Figure 19:
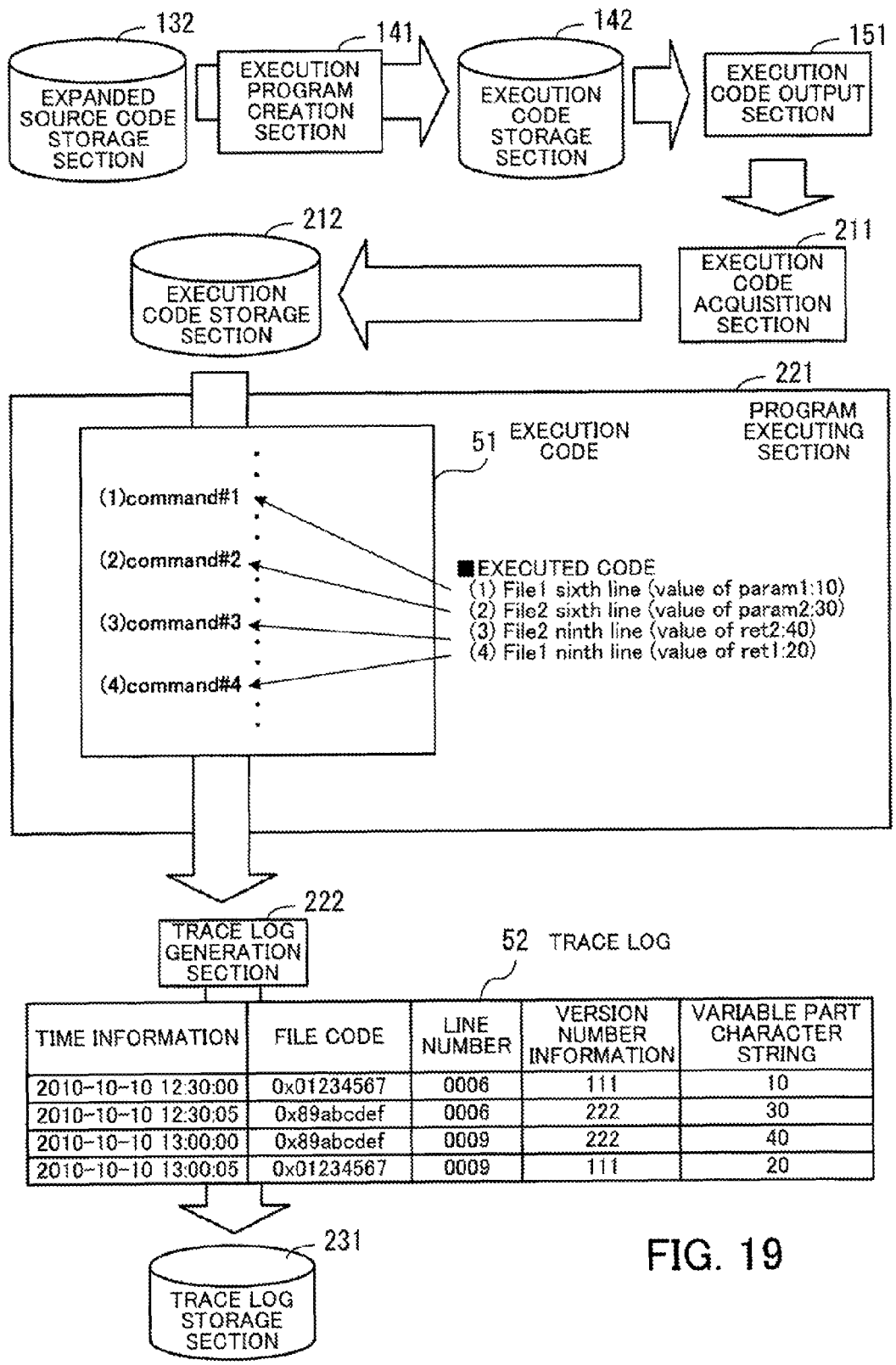
FIG. 19 illustrates an example of a trace log acquired from an execution code.

FIG. 19 illustrates an example of the trace log acquired from the execution code. An execution code 51, which is generated by the execution program creation section 141 based on the expanded source codes 41 and 42 stored in the expanded source code storage section 132, is first stored in the execution code storage section 142. The execution code 51 stored in the execution code storage section 142 is passed from the execution code output section 151 of the development device 100 to the execution code acquisition section 211 of the execution device 200, and is stored in the execution code storage section 212. Then, the execution code 51 stored in the execution code storage section 212 is executed by the program executing section 221.

At this time, the execution code 51 includes commands which are respective machine-language translations of the log acquisition commands in the expanded source codes 41 and 42. When executing the commands, the program-executing section 221 calls the log trace function, and starts the trace log-generating section 222 that executes processing of the log trace function. The trace log-generating section 222 generates a trace log 52.

In the FIG. 19 example, "command#1" in the execution code 51 represents a machine-language translation of the log acquisition command on the sixth line of the expanded source code 41. By executing this command, e.g. a value of "10" of a variable "param1" is acquired. "command#2" in the execution code 51 represents a machine-language translation of the log acquisition command on the sixth line of the expanded source code 42. By executing this command, e.g. a value of "30" of a variable "param2" is acquired. "command#3" in the execution code 51 is a machine-language translation of the log acquisition command on the ninth line of the expanded source code 42. By executing this command, e.g. a value of "40" of a variable "ret2" is acquired. "command#4" in the execution code 51 is a machine-language translation of the log acquisition command on the ninth line of the expanded source code 41. By executing this command, e.g. a value of "20" of a variable "ret1" is acquired.

The trace log-generating section 222 registers information acquired by execution of the log acquisition commands in the trace log 52. In FIG. 19 example, there is generated a trace log 52 having a time information column, a file code column, a line number column, a version number information column, and a variable part character string column. This trace log 52 is distinguished from the trace log 231a illustrated in FIG. 12 in that it has the time information column added thereto. Time points at which variable part character strings have been acquired are set in the time information column. The generated trace log 52 is stored in the trace log-storing section 231.

Figure 20:
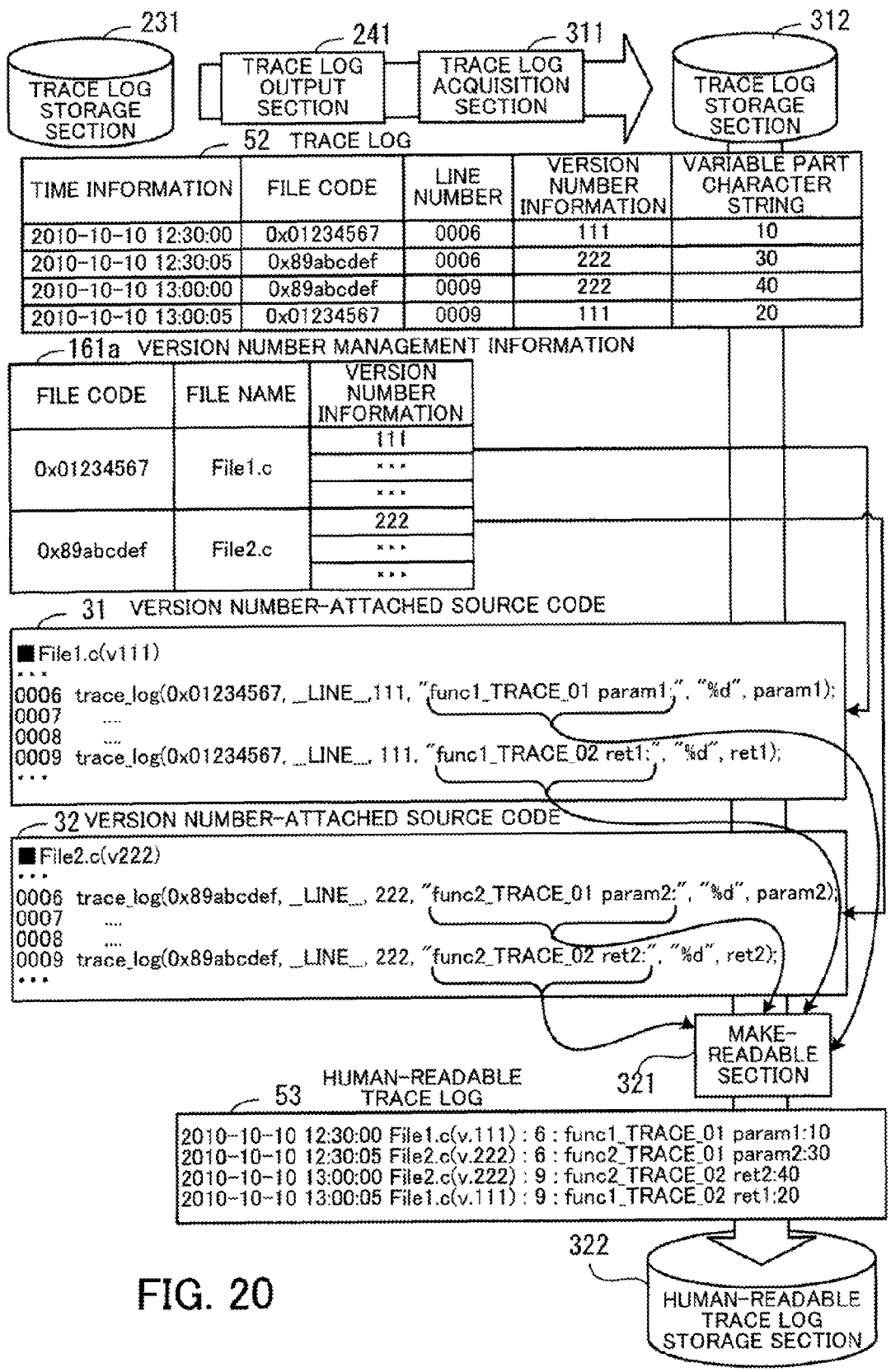
FIG. 20 illustrates an example of making the trace log human-readable.

FIG. 20 illustrates an example of making the trace log readable. The trace log 52 stored in the trace log-storing section 231 is passed from the trace log output section 241 of the execution device 200 to the trace log acquisition section 311 of the analyzer 300, and is stored in the trace log-storing section 312.

The make-readable section 321 recognizes the file names of the version number-attached source codes 31 and 32 used for creating the execution code 51, from the file code of each record in the trace log 52. Further, the make-readable section 321 determines the version number-attached source codes 31 and 32 used for creating the execution code 51, based on a combination of a file name corresponding to the file code of each record in the trace log 52 and version number information of the record. Then, the make-readable section 321 determines a log acquisition command corresponding to the record based on the line number of each record in the trace log 52, and acquires a fixed part character string from the fourth parameter of the log acquisition command.

The make-readable section 321 converts the file code of each record in the trace log 52 to a file name. Further, the make-readable section 321 adds the fixed part character string to each record to thereby generate a human-readable trace log 53. The generated human-readable trace log 53 is stored in the human-readable trace log-storing section 322.

As described above, the file names and the version number information items of the source codes from which is generated the execution code 51 having been executed by the execution device 200 are indicated in the generated readable trace log 53. Therefore, if a user of the analyzer 300 refers to the human-readable trace log 53, it is possible to determine source codes corresponding to the execution code 51 having been executed by the execution device 200, from a plurality of versions of each source code which have respective version numbers. Further, since the human-readable trace log 53 includes the fixed part character strings, the user of the analyzer 300 can visually and easily recognize the meaning of values indicated by the variable part character strings.

Furthermore, since the trace log 52 includes the version number information, it is possible to uniquely determine source codes corresponding to the trace log 52, each from a plurality of source codes identical in file name but different in version number, and based on the corresponding source codes, it is possible to convert the file codes in the trace log 52 to file names and insert fixed part character strings into the trace log 52.

Moreover, in the second embodiment, a trace log is made readable using information included in the version management system 160 of the development device 100, so that the analyzer 300 need not store information, such as a list of fixed part character strings of log acquisition commands in source codes. This makes it possible to make efficient use of a storage area, such as the HDD of the analyzer 300.

In the system configured as described above, the execution device 200 is a shipped device with integrated CPU (CPU built-in device), for example. In such a CPU built-in device, there is a case where a program executed by a built-in CPU is updated e.g. for expansion of functions. When the program is updated to thereby update the version number thereof after a certain time point, records collected from programs different in version number mixedly exist in a trace log stored in the CPU built-in device. When investigating reasons for such operation errors of the CPU built-in device, the trace log is referred to. At this time, by analyzing the trace log using the analyzer 300 according to the second embodiment, it is possible to determine the version number of a program used for obtaining each record in the trace log. As a consequence, it is possible to determine the version number of a program which has caused any operation error. This makes it possible to improve the efficiency of analysis.

Further, there is also a case where the execution device 200 is caused to execute a program so as to debug software in development stage. When in development stage of software, the contents of a program (software) are improved little by little, and debugging is performed as on an as-needed basis. For example, there is a case where software is repeatedly upgraded, and whenever upgraded, it is caused to be executed in an execution environment to acquire trace logs of respective different versions of the software. Even in such a case, according to the second embodiment, it is possible to identify a version number of the software for which each trace log is acquired, and correctly change relevant information into information that can be interpreted by human. This makes it possible to improve the efficiency of the debug operation.

Third Embodiment

Next, the third embodiment will be described. The third embodiment expresses a human-readable trace log not as plain text data but in markup language, to thereby conspicuously display items desired to be highlighted. Note that the third embodiment is provided not only with the functions of the devices illustrated in FIG. 6 but also with a view section in the analyzer 300. The view section creates data for screen display based on the human-readable trace log described in the markup language, and displays the contents of the human-readable trace log on a screen.

Figure 21:
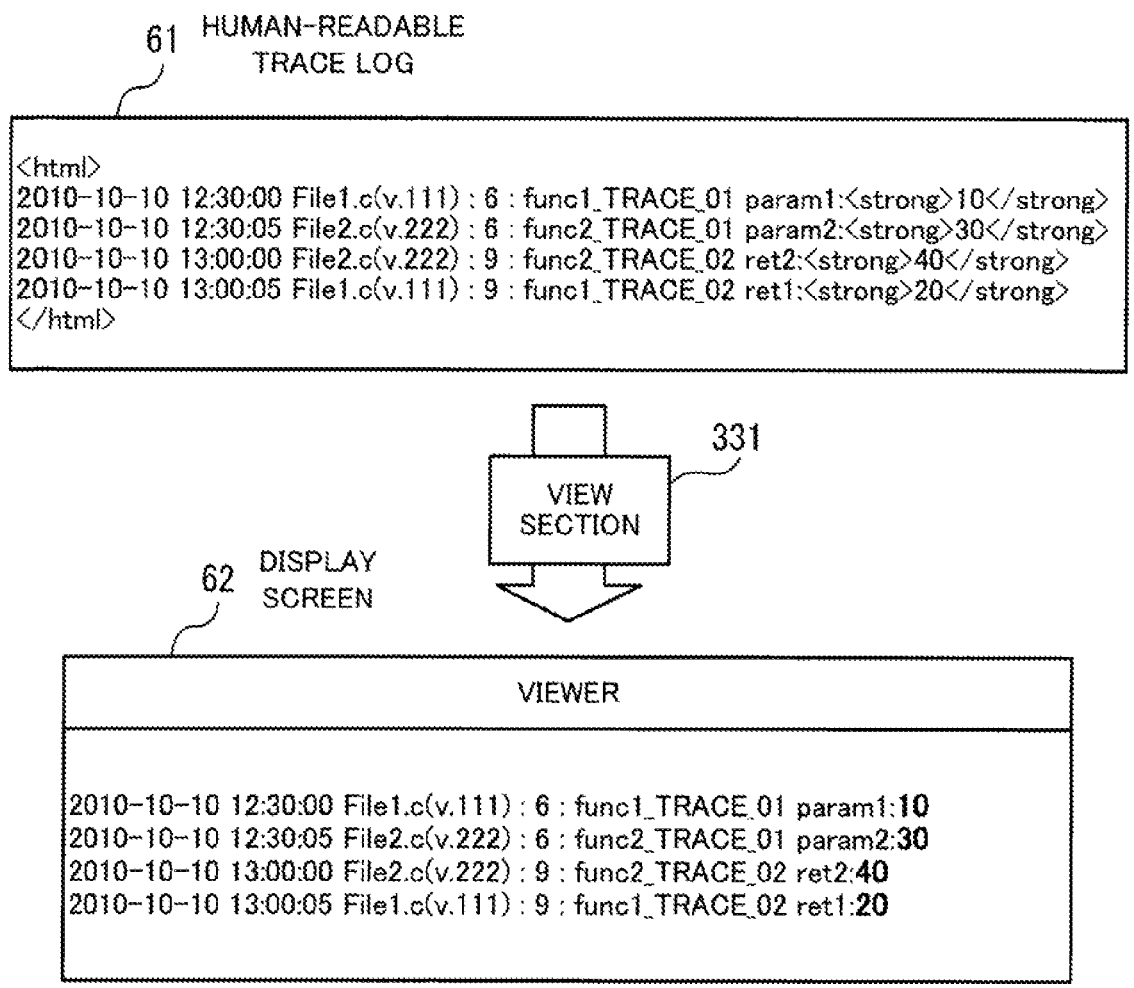
FIG. 21 illustrates an example of a human-readable trace log according to a third embodiment.

FIG. 21 illustrates an example of the human-readable trace log according to the third embodiment. In the FIG. 21 example, out of the contents of the human-readable trace log 53 in FIG. 20 according to the second embodiment, the variable part character strings are highlighted.

In the third embodiment, the make-readable section 321 creates the human-readable trace log 61 in the HTML (Hyper-Text Markup Language) format. The make-readable section 321 creates the human-readable trace log 61 having a variable part character string surrounded by a strong tag for highlighting.

Such a human-readable trace log 61 created in the HTML format is displayed by the view section, denoted by reference numeral 331, which is compatible with the HTML format, whereby the variable part character string is highlighted on a display screen 62. A web browser, for example, can be used as the view section 331.

By thus highlighting important portions, the contents of the human-readable trace log 61 become easier to grasp.

Fourth Embodiment

Next, the fourth embodiment will be described. The fourth embodiment represents a human-readable trace log in a language, such as the HTML, which has a hyperlink function, and designates each source code as a link destination. This makes it possible, when a desired line of a trace log is clicked, to display a file of a source code that outputs the clicked log.

Figure 22:
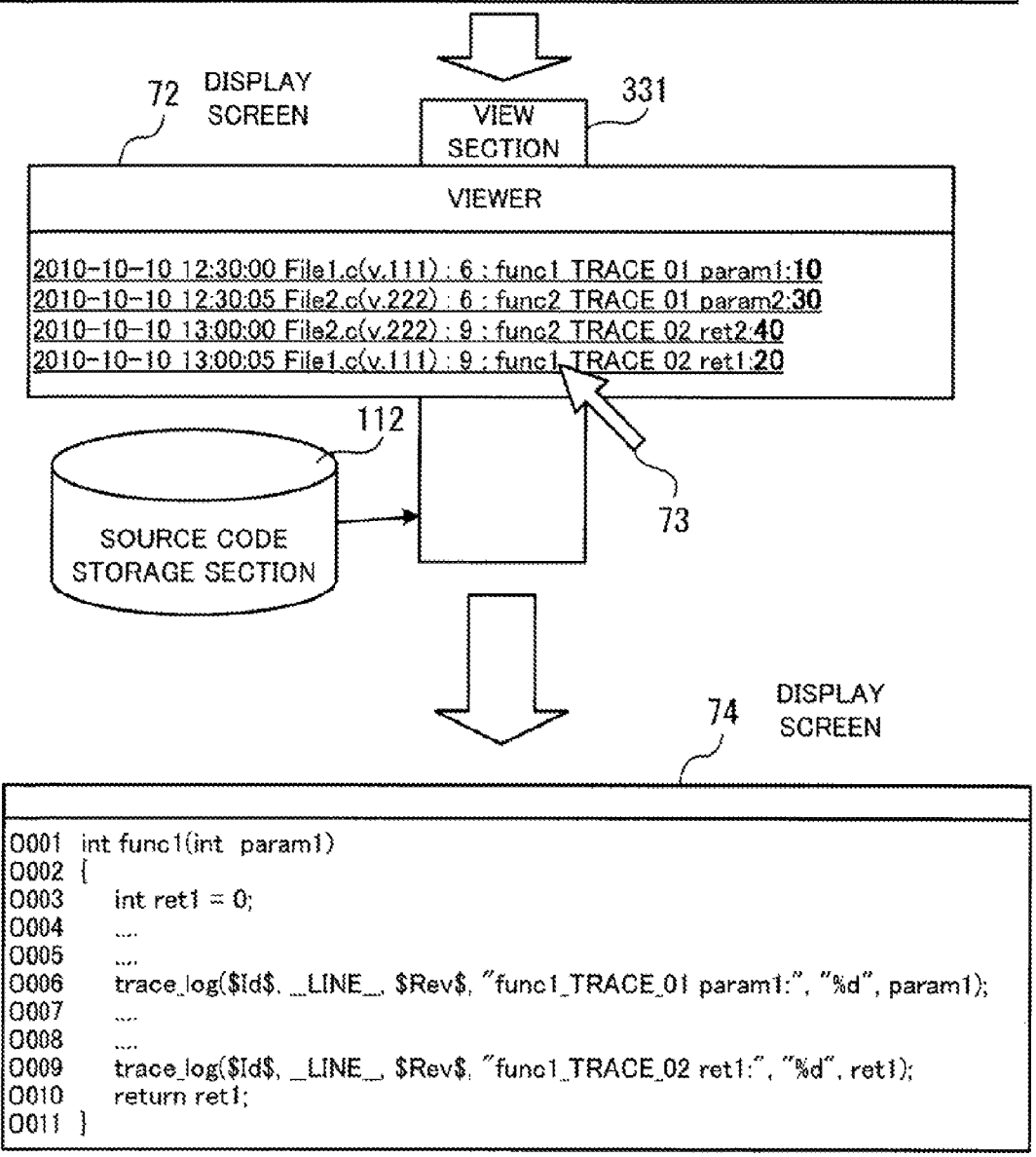
FIG. 22 illustrates an example of a human-readable trace log according to a fourth embodiment.

FIG. 22 illustrates an example of the human-readable trace log according to the fourth embodiment. In the FIG. 22 example, out of the contents of the human-readable trace log 53 in FIG. 20 according to the second embodiment, the variable part character strings are highlighted, and a hyperlink to the source code is set on each line of the trace log.

In the fourth embodiment, the make-readable section 321 creates the human-readable trace log 71 in the HTML format. In the human-readable trace log 71 created by the make-readable section 321, each variable part character string is surrounded by a strong tag for highlighting, and each line is surrounded by an anchor tag. A URL (uniform resource locator) is set in the anchor tag surrounding each line as position information of a version number-attached source code corresponding to a combination of a file name and version number information. For example, the make-readable section 321 acquires the URL of a version number-attached source code in the version number-attached source code storage section 162, or the URL of a source code in the source code storage section 112, from the expansion device 100, and sets the URL in the human-readable trace log 71.

The human-readable trace log 71 described above is displayed by the view section 331. On a display screen 72, each variable part character string is highlighted, and an underline indicative of the presence of the hyperlink is displayed on each line.

For example, when one of the lines on the display screen 72 is selected by a mouse pointer 73, the view section 331 acquires a corresponding source code from the source code storage section 112 in the expansion device 100, based on the URL set in the anchor tag. Then, the view section 331 displays the contents of the acquired source code on a display screen 74.

As described above, it is possible to easily access the source codes in the expansion device 100. Note that although in the FIG. 22 example, file codes, and source codes before expansion of version number information are displayed, version number-attached source codes in the version management system 160 may be displayed. Further, expanded source codes may be displayed.

Fifth Embodiment

Next, the fifth embodiment will be described. The fifth embodiment provides macro definition of information items ($Id$, $Rev$) beforehand which are to be designated in a log trace function and are to be expanded by the version management system.

FIG. 23 illustrates examples of source codes according to the fifth embodiment. In the source codes 81 and 82, the information items are defined as "#define ID$Id$" and "#define REV$Rev$" using "#define". Similarly to the second embodiment, "$Id$" and "$Rev$" in these sentences are expanded by the version management system registration section 121, whereby version number-attached source codes 83 and 84 are generated. In the version number-attached source code 83, "$Id$" is replaced by the file cord "0x01234567" uniquely associated with the file name "File1", and "$Rev$" is replaced by the version number information "111" in the source code 81. Further, in the version number-attached source code 84, "$Id$" is replaced by the file cord "0x89abcdef" uniquely associated with the file name "File2", and "$Rev$" is replaced by the version number information "222" in the source code 82.

As described above, keywords in the macro-defined log trace function are expanded to values after replacement of "$Id$" and "$Rev$" by a preprocessor used during compilation. This makes it possible to acquire the same execution codes as in the second embodiment.

Another Embodiment

Although in the above-described second embodiment, the expansion device 100 and the analyzer 300 are configured as separate devices, it is also possible to integrate the functions of the expansion device 100 and the analyzer 300 into a single device.

Note that the processing functions of the above-described embodiments can be realized by a computer. In this case, there is provided a program describing the details of processing of the functions which the information processing apparatuses 1 to 3, the expansion device 100, the execution device 200, and the analyzer 300 have. By executing the program on the computer, the processing functions described above are realized on the computer. The program describing the details of processing can be recorded in a computer-readable recording medium. Examples of the computer-readable recording medium include a magnetic recording device, an optical disk, a magneto-optical recording medium, and a semiconductor memory. Examples of the magnetic recording device include a hard disk drive (HDD), a flexible disk (FD), and a magnetic tape. Examples of the optical disk include a DVD (Digital Versatile Disk), a DVD-RAM (Random Access Memory), a CD-ROM (Compact Disk Read Only Memory)/RW (ReWritable). Further, the magneto-optical recording medium includes an MO (Magneto-Optical disk), for example.

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer that carries out the program stores for example, the program which is recorded in the portable record medium or is transferred from the server computer, in the storage device thereof. Then, the computer reads out the program from the storage device thereof, and carries out the processes according to the program. Note that the computer is also capable of directly reading out the program from the portable record medium, and carrying out the processes according to the program. Further, the computer is also capable of carrying out the processes according to the program which is received, each time the program is transferred from the server computer.

Further, at least part of the above-described processing functions can be realized by an electronic circuit, such as DSP (Digital Signal Processor), ASIC (Application Specific Integrated Circuit), PLD (Programmable Logic Device), or the like.

It is possible to determine a version number of each of source codes of a program which has been executed during acquisition of a trace logs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus including one or more processors configured to perform a procedure, the procedure comprising:

executing a program including a log acquisition command having set therein identification information on a file describing a source code of the program, version number information on the source code, a variable, and a line number of a line describing the log acquisition command in the source code;

acquiring a value of the variable set in the log acquisition command when the log acquisition command has reached a stage of execution;

generating a trace log including the identification information on the file and the version number information set in the log acquisition command in the stage of execution, the value of the acquired variable, and the line number included in the log acquisition command in the stage of execution; and storing the trace log in a storage device.

2. An information processing apparatus including one or more processors configured to perform a procedure, the procedure comprising:

acquiring, based on a trace log including identification information on a file describing a source code of a program, version number information on the source code, a value of a variable, and a line number of a line describing a log acquisition command in the source code, the source code corresponding to a combination of the identification information on the file and the version number information;

extracting from the log acquisition command described on the line, which is indicated by the line number included in the trace log, in the source code acquired based on the trace log, a character string related to the trace log;

adding the extracted character string to the trace log; and storing the trace log having the character string added thereto, in a storage device.

3. The information processing apparatus according to claim 2, wherein the identification information on the file included in the trace log is a code uniquely associated with the file describing the source code, and wherein the acquiring determines a file name corresponding to the code included in the trace log, based on management information in which is registered a correspondence between a file name of the file describing the source code and the code uniquely associated with the file, and acquires the source code from a file corresponding to a combination of the file name and the version number information included in the trace log.

4. The information processing apparatus according to claim 3, wherein the code uniquely associated with the file has an amount of data smaller than an amount of data of the file name of the file.

5. The information processing apparatus according to claim 3, wherein the extracting adds the file name corresponding to the code included in the trace log, to the trace log.

6. The information processing apparatus according to claim 2, wherein the extracting extracts a character string related to a value of a variable included in the trace log.

7. The information processing apparatus according to claim 2, wherein the extracting stores, in the storage device, a file describing contents of the trace log having the character string extracted from the source code added thereto, in a markup language.

8. The information processing apparatus according to claim 7, wherein the extracting adds a description for highlighting the value of the variable in the trace log having the character string extracted from the source code added thereto, to the file describing the contents of the trace log having the character string extracted from the source code added thereto.

9. The information processing apparatus according to claim 7, wherein the extracting adds a hyperlink linking to the source code, to the trace log having the character string extracted from the source code added thereto.

10. A method of acquiring a trace log, the method comprising:

a first procedure executed by a first information processing apparatus, comprising:

executing a program including a log acquisition command having set therein identification information on a file describing a source code of the program, version number information on the source code, a variable, and a line number of a line describing the log acquisition command in the source code;

acquiring, when the log acquisition command has reached a stage of execution, a value of the variable set in the log acquisition command in the stage of execution;

generating a trace log including the identification information on the file and the version number information set in the log acquisition command in the stage of execution, the acquired value of the variable, and the line number included in the log acquisition command in the stage of execution; and storing the generated trace log in a first storage device; and a second procedure executed by a second information processing apparatus, comprising:

acquiring, based on the trace log stored in the first storage device, the source code corresponding to the combination of the identification information on the file and the version number information included in the trace log;

extracting from the log acquisition command described on the line, which is indicated by the line number included in the trace log, in the source code acquired based on the trace log, a character string related to the trace log;

adding the extracted character string to the trace log; and storing the trace log having the character string added thereto, in a second storage device.

11. The trace log-acquiring method according to claim 10, further comprising:

a third procedure executed by a third processing apparatus, comprising:

setting in a log acquisition command included in the source code of the program, a code uniquely associated with a file name of a file describing the source code, as identification information on the file, and setting version number information on the source code in the log acquisition command; and storing management information including the file name of the file describing the source code, the code corresponding to the file name, and the version number information on the source code, in a manner associated with the file describing the source code, in a third storage device, wherein the first procedure further comprises executing a program including the log acquisition command having the code uniquely associated with the file name set as the identification information on the file, and wherein the second procedure further comprises determining the file name corresponding to the code included in the trace log, based on the management information stored in the third storage device, and acquiring the source code from the file associated with the management information including the file name and the version number information included in the trace log.

* * * * *